(12) United States Patent
Zhong

(10) Patent No.: US 9,215,007 B2
(45) Date of Patent: Dec. 15, 2015

(54) OPTICAL NETWORK SWITCHING NODE IN MULTI-CHASSIS CLUSTER, OPTICAL BURST SYNCHRONIZATION METHOD, AND LINE CARD CHASSIS

(71) Applicant: Huawei Technologies Co., Ltd., Shenzhen, Guangdong (CN)

(72) Inventor: Qiwen Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 14/285,164

(22) Filed: May 22, 2014

(65) Prior Publication Data
US 2014/0255022 A1     Sep. 11, 2014

Related U.S. Application Data

(63) Continuation of application No. PCT/CN2011/082939, filed on Nov. 25, 2011.

(51) Int. Cl.
*H04B 10/077* (2013.01)
*H04B 10/073* (2013.01)
(Continued)

(52) U.S. Cl.
CPC .......... *H04B 10/0773* (2013.01); *H04B 10/073* (2013.01); *H04B 10/077* (2013.01); *H04B 10/0775* (2013.01); *H04L 7/0075* (2013.01); *H04L 7/10* (2013.01); *H04L 49/1515* (2013.01);
(Continued)

(58) Field of Classification Search
CPC .. H04B 10/073; H04B 10/077; H04L 7/0075; H04L 7/10; H04L 2012/5674; H04Q 11/0005; H04Q 11/0066; H04Q 2011/0045

USPC ................... 398/16, 154, 155, 45, 51, 53, 55
See application file for complete search history.

(56) References Cited

U.S. PATENT DOCUMENTS 7,340,172 B2    3/2008  Giles et al.
7,835,649 B2   11/2010  Epps et al.
(Continued)

FOREIGN PATENT DOCUMENTS

EP     2 293 498 A1    3/2011
EP     2 323 300 A1    5/2011
(Continued)

OTHER PUBLICATIONS

Mario Baldi, et al., "Fractional Lambda Switching", 2002, 5 pages.

*Primary Examiner* — Li Liu

(57) ABSTRACT

An embodiment of the present invention provides an optical burst synchronization method. A synchronization method includes: selecting a reference chassis, and transmitting, by an output port corresponding to an FTL in the reference chassis, an optical burst test signal respectively to receive ports corresponding to ORs in other line card chassis, where the optical burst test signal carries a transmission timeslot number; and acquiring, by a receive port corresponding to an OR in each line card chassis, according to an optical path difference between the receive port corresponding to the OR in each line card chassis and the output port corresponding to the FTL in the reference chassis, time of receiving the optical burst test signal, and the transmission timeslot number, a time-phase difference between each line card chassis and the reference chassis, and calibrating a local clock phase according to the time-phase difference.

19 Claims, 6 Drawing Sheets

(51) Int. Cl.
*H04L 7/00* (2006.01)
*H04L 7/10* (2006.01)
*H04Q 11/00* (2006.01)
*H04L 12/933* (2013.01)
*H04L 12/70* (2013.01)

(52) U.S. Cl.
CPC ....... *H04Q 11/0005* (2013.01); *H04Q 11/0062* (2013.01); *H04Q 11/0066* (2013.01); *H04L 2012/5674* (2013.01); *H04Q 2011/0018* (2013.01); *H04Q 2011/0024* (2013.01); *H04Q 2011/0032* (2013.01); *H04Q 2011/0033* (2013.01); *H04Q 2011/0035* (2013.01); *H04Q 2011/0045* (2013.01); *H04Q 2011/0056* (2013.01); *H04Q 2011/0083* (2013.01); *H04Q 2011/0088* (2013.01)

(56) References Cited

U.S. PATENT DOCUMENTS

| | | | |
|---|---|---|---|
| 2004/0202472 A1* | 10/2004 | Giles | H04J 14/0227 398/75 |
| 2006/0146888 A1* | 7/2006 | Den Hollander | H04J 3/0685 370/503 |
| 2007/0201877 A1* | 8/2007 | Epps | H04J 14/0227 398/154 |
| 2011/0097090 A1* | 4/2011 | Cao | H04J 3/0658 398/154 |

FOREIGN PATENT DOCUMENTS

| | | | | |
|---|---|---|---|---|
| IE | EP 2323300 A1 * | 5/2011 | ....... | H04J 14/0283 |
| KR | 2006-0079090 A | 7/2006 | | |
| WO | WO 01/95661 A1 | 12/2001 | | |

\* cited by examiner

OPTICAL NETWORK SWITCHING NODE IN MULTI-CHASSIS CLUSTER, OPTICAL BURST SYNCHRONIZATION METHOD, AND LINE CARD CHASSIS

CROSS-REFERENCE TO RELATED APPLICATIONS

This application is a continuation of International Application No. PCT/CN2011/082939, filed on Nov. 25, 2011, which is hereby incorporated by reference in its entirety.

TECHNICAL FIELD

Embodiments of the present invention relate to network communications technologies, and in particular, to an optical network switching node in a multi-chassis cluster, an optical burst synchronization method, and a line card chassis.

BACKGROUND

With progress of time and continuous fast development of Internet Protocol (Internet Protocol, IP for short) services such as a third-generation (3rd-Generation, 3G for short) mobile communications service, Internet Protocol television (Internet Protocol Television, IPTV for short), video conferencing, streaming, and point-to-point (Point-to-Point, P2P for short), IP network traffic increases sharply, and Internet bandwidth demands have witnessed explosive growth. Internet traffic is doubled every 12 months over the recent years, but the capacity of a router is only doubled every 18 months. The speed at which the Internet traffic grows is far higher than that at which the capacity of equipment such as a router increases. Currently, available capacities of a single router and a core router in a cluster have exceeded levels of 1 Tbps and 100 Tbps respectively. Although further increase is possible, the development of the single router and cluster nodes is limited by maturity of optical components having high-rate ports. Furthermore, because of factors such as the power consumption of the single router and cluster nodes, heat dissipation, and bearing capacity of an equipment room, the single router and cluster nodes are unable to meet requirements of Internet traffic growth.

A supporting network and node corresponding to an IP service bearer network and node are a transport network and transport network node developed in parallel. The transport network and node not only undertake interconnection, transport, and bearing tasks between router nodes, but also undertake dedicated line services. Service development promotes generation and development of an all-optical switching technology. All-optical switching is mainly implemented by using passive optical components, and has a distinguishing characteristic of low power consumption. With respect to bearer networks and node technologies for IP and IP-like services, the industry and research circle put forward an optical packet switching/optical burst switching (Optical Packet Switching/Optical Burst Switching, OPS/OBS for short) concept and so on, seeking processing, switching, and buffering directly on optical signals. It is a pity that, in the current OPS/OBS concept, many key technologies, optical random storage/buffer components, and technologies and components for directly processing optical packets and optical burst headers in an optical domain can hardly achieve a breakthrough and cannot be put into practical commercial applications. Technologies in the OPS/OBS concept, due to data loss and reliability, are inapplicable to transport application scenarios that require high reliability. Currently, common transport networks mainly include a conventional synchronous digital hierarchy (Synchronous Digital Hierarchy, SDH for short), a synchronous optical network (Synchronous Optical Network, SONET for short), and an emerging optical transport network (Optical Transport Network, OTN for short). The emerging OTN is a mainstream technology in the current transport network, and will gradually replace the conventional SDH/SONET. With the development of services, a core transport node of the emerging OTN is also faced with a capacity requirement problem. In addition, compared with a router node, the core transport node of the emerging OTN is faced with a large-capacity requirement that is far higher than that of the router node. Generally, the required capacity of the core transport node of the OTN is several times to dozens of times that of a core router.

However, in implementation of the OTN and the core transport node of the OTN, total power consumption of a cabinet denotes a heat dissipation requirement at a corresponding level. Both density of heat generation and density of power consumption allowed by an equipment room are limited. Density of heat generation and density of power consumption allowed by a cabinet are also limited. As early as in 2003, the required maximum power consumption designed for a cabinet had reached 10 kw, but the average power supply capacity of equipment rooms at the time was designed to be 1.1 kw per cabinet, and the average power consumption in actual running was about 1.7 kw; capacities of 90% equipment rooms were designed to be 3 kw per cabinet, and the average power consumption in actual running was about 2 kw; the maximum capacity was designed to be 6 kw per cabinet, but the highest power consumption of a cabinet at the time had reached 12 kw. Currently, for a standard telecommunication equipment cabinet of 2200 mm (H)×600 mm (W)×600 mm (D), the total power consumption of the cabinet may reach about 20-24 kw, already far higher than an ultimate heat dissipation capability of each cabinet, that is, 4-6 kw in an equipment room with standard cabinet layout. This is equivalent to the power consumption and heat dissipation budget of 4 or 5 standard cabinets in the equipment room. In addition, limited by signal attenuation of a high-speed electrical backplane, a transmission distance of a single equipment can only reach 75 cm to 100 cm. To overcome the transmission distance problem, usually two equipments (chassis) are placed in such a cabinet; however, even if two equipments (chassis) are placed, the total capacity of the cabinet is only about 12.8T (typically, the capacity of each equipment is about 6.4T). Currently, switching of sub-wavelength bandwidth granularities smaller than the line bandwidth (2.5 G; 10 G; 40 G; 100 G) of an OTU-k depends on an electrical node of the OTN, but the capacity requirement of the electrical node of the OTN already reaches the P-level requirement of one P or several Ps. The conventional electrical node of the OTN is also constrained by factors such as the total power consumption of the cabinet, heat dissipation, and bearing capacity of the equipment room in the face of the P-level capacity requirement, and it is difficult to achieve a breakthrough. Therefore, a multi-chassis cluster becomes a future development direction of the OTN. For the electrical node of the OTN, to implement multi-chassis cascading, only optical or electrical interconnection or all-electrical switching can be adopted. All-electrical switching requires relatively high power consumption, which limits full playing of the cascading capability of multiple equipments. To resolve the problem of high power consumption in all-electrical switching, all-optical switching may be used to replace all-electrical switching. However, for all-optical switching, optical burst synchronization is critical to implementation of all-optical switching.

SUMMARY

The present invention provides an optical network switching node in a multi-chassis cluster, an optical burst synchronization method, and a line card chassis, which are used to resolve the optical burst synchronization problem, so as to implement a multi-chassis cluster system based on an OTN technology, increase the system capacity, meet increasing bandwidth requirements, and further resolve the problem that implementation of a multi-chassis cluster is limited by relatively high power consumption of an electrical switching node in the prior art.

In one aspect, the present invention provides an optical burst synchronization method, including:

selecting one line card chassis from multiple line card chassis connected to a same all-optical switching element, as a reference chassis, and transmitting, by an output port corresponding to a wavelength-tunable optical transmission laser FTL in the reference chassis, an optical burst test signal by using the FTL respectively to receive ports corresponding to optical receivers ORs in the multiple line card chassis connected to the same all-optical switching element, where the optical burst test signal carries a transmission timeslot number, and acquiring, by a receive port corresponding to an OR in each line card chassis connected to the same all-optical switching element, according to an optical path difference between the receive port corresponding to the OR in each line card chassis and the output port corresponding to the FTL in the reference chassis, time of receiving the optical burst test signal, and the transmission timeslot number carried in the optical burst test signal, a time-phase difference between the receive port corresponding to the OR in each line card chassis and the output port corresponding to the FTL in the reference chassis, and adjusting, according to the time-phase difference, a clock phase referenced for receiving electrical burst data on the receive port corresponding to the OR and a clock phase referenced for transmitting electrical burst data on an output port corresponding to an FTL located in the same line card chassis and corresponding to the OR.

In another aspect, the present invention provides an optical burst synchronization method, including:

selecting one line card chassis from multiple line card chassis connected to a same all-optical switching element, as a reference chassis;

transmitting, by an output port corresponding to a wavelength-tunable optical transmission laser FTL in each line card chassis connected to the same all-optical switching element, an optical burst test signal by using the FTL to a receive port corresponding to an optical receiver OR in the reference chassis, where the optical burst test signal carries a transmission timeslot number, acquiring, by the receive port corresponding to the OR in the reference chassis, according to an optical path difference between the receive port corresponding to the OR in the reference chassis and the output port corresponding to the FTL in each line card chassis, time of receiving the optical burst test signal transmitted by the output port corresponding to the FTL in each line card chassis, and the transmission timeslot number carried in the optical burst test signal, a time-phase difference between the receive port corresponding to the OR in the reference chassis and the output port corresponding to the FTL in each line card chassis, and transmitting the time-phase difference between the receive port corresponding to the OR in the reference chassis and the output port corresponding to the FTL in each line card chassis to the output port corresponding to the FTL in each line card chassis; and adjusting, by the output port corresponding to the FTL in each line card chassis, according to the time-phase difference, a clock phase referenced for transmitting electrical burst data on the output port corresponding to the FTL.

In one aspect, the present invention provides a line card chassis, including:

a receive-end electrical switching element and a transmit-end electrical switching element, where the receive-end electrical switching element includes multiple receive ports, multiple output ports, and a wavelength-tunable optical transmission laser FTL connected to each output port, and the transmit-end electrical switching element includes multiple receive ports, multiple output ports, and an optical receiver OR connected to each receive port, where:

the output port corresponding to each FTL is configured to transmit, when the line card chassis is selected as a reference chassis, an optical burst test signal to a receive port corresponding to an optical receiver OR in other line card chassis that are connected to a same all-optical switching element as the reference line card chassis, so that the receive port corresponding to the OR in the other line card chassis acquires, according to an optical path difference between the receive port corresponding to the OR in the other line card chassis and the output port corresponding to the FTL that transmits the reference test signal in the reference chassis, time of receiving the optical burst test signal, and a transmission timeslot number carried in the optical burst test signal, a time-phase difference between the receive port corresponding to the OR in the other line card chassis and the output port corresponding to the FTL in the reference chassis, and adjusts, according to the time-phase difference, a clock phase referenced for receiving electrical burst data on the receive port corresponding to the OR and a clock phase referenced for transmitting electrical burst data on an output port corresponding to an FTL located in the same line card chassis and corresponding to the OR; and the receive port corresponding to each OR is configured to receive, when one line card chassis among the other line card chassis that are connected to the same all-optical switching element as the line card chassis is selected as a reference chassis, an optical burst test signal transmitted by an output port corresponding to an FTL in the reference chassis by using the FTL, acquire, according to an optical path difference between the receive port corresponding to each OR and the output port corresponding to the FTL that transmits the optical burst test signal in the reference chassis, time of receiving the optical burst test signal, and a transmission timeslot number carried in the optical burst test signal, a time-phase difference between the receive port corresponding to each OR and the output port corresponding to the FTL that transmits the optical burst test signal in the reference chassis, and adjust, according to the time-phase difference, a clock phase referenced for receiving electrical burst data on the receive port corresponding to the OR and a clock phase referenced for transmitting electrical burst data on the output port corresponding to the FTL located in the same line card chassis and corresponding to the OR.

In another aspect, the present invention provides a line card chassis, including:

a receive-end electrical switching element and a transmit-end electrical switching element, where the receive-end electrical switching element includes multiple receive ports, multiple output ports, and a wavelength-tunable optical transmission laser FTL connected to each output port, and the transmit-end electrical switching element includes multiple receive ports, multiple output ports, and an optical receiver OR connected to each receive port, where:

the output port corresponding to each FTL is configured to transmit an optical burst test signal from the line card chassis to a receive port corresponding to an OR in a line card chassis that is connected to a same all-optical switching element as the line card chassis and selected as a reference chassis, receive a time-phase difference between the output port corresponding to the FTL in the reference chassis and the receive port corresponding to the OR in said other line chassis, from the receive port corresponding to the OR in the reference chassis, and adjust, according to the time-phase difference, a clock phase referenced for transmitting electrical burst data on the output port corresponding to the FTL, where the optical burst test signal carries a transmission timeslot number, and the time-phase difference is acquired by the receive port corresponding to the OR in the reference chassis according to an optical path difference between the receive port corresponding to the OR in the reference chassis and the output port corresponding to the FTL that transmits the optical burst test signal in the line card chassis, time of receiving the optical burst test signal transmitted by the output port corresponding to the FTL in the line card chassis, and the transmission timeslot number carried in the optical burst test signal; and the receive port corresponding to each OR is configured to receive, when the line card chassis is selected as a reference chassis, an optical burst test signal transmitted by an output port corresponding to an FTL in other line card chassis that are connected to the same all-optical switching element as the reference line card chassis, acquire, according to an optical path difference between the receive port corresponding to each OR and the output port corresponding to the FTL in the other line card chassis, time of receiving the optical burst test signal transmitted by the output port corresponding to the FTL in the other line card chassis, and a transmission timeslot number in the optical burst test signal, a time-phase difference between the receive port corresponding to each OR and the output port corresponding to the FTL in the other line card chassis, and transmit the time-phase difference to the output port corresponding to the FTL in the other line card chassis, so that the output port corresponding to the FTL in the other line card chassis adjusts, according to the time-phase difference, a clock phase referenced for transmitting electrical burst data on the output port corresponding to the FTL in the other line card chassis.

In one aspect, the present invention provides an optical network switching node in a multi-chassis cluster, including any line card chassis and all-optical switching element provided by one aspect of the present invention, where:

the all-optical switching element includes multiple input ends and multiple output ends; each output port of each receive-end electrical switching element is connected, by using an FTL connected to the output port, to an input end of the all-optical switching element, and each receive port of each transmit-end electrical switching element is connected, by using an OR connected to the receive port, to an output port of the all-optical switching element;

each receive-end electrical switching element is configured to receive multiple data units through multiple receive ports of the receive-end electrical switching element, perform stage-1 electrical switching for the received multiple data units, and after electrical/optical conversion is performed by FTLs connected to multiple output ports of the receive-end electrical switching element, output the multiple data units to the all-optical switching element;

the all-optical switching element is configured to perform all-optical space division switching for the multiple data units output by the receive-end electrical switching element, and output the multiple data units to the transmit-end electrical switching element; and the transmit-end electrical switching element is configured to perform optical/electrical conversion, by using ORs connected to multiple receive ports of the transmit-end electrical switching element, for the multiple data units output by the all-optical switching element, and then perform stage-2 electrical switching for the multiple data units after the optical/electrical conversion, and output the multiple data units through multiple output ports of the transmit-end electrical switching element.

In another aspect, the present invention provides an optical network switching node in a multi-chassis cluster, including any line card chassis and all-optical switching element provided by another aspect of the present invention, where:

the all-optical switching element includes multiple input ends and multiple output ends; each output port of each receive-end electrical switching element is connected, by using an FTL connected to the output port, to an input end of the all-optical switching element, and each receive port of each transmit-end electrical switching element is connected, by using an OR connected to the receive port, to an output port of the all-optical switching element;

each receive-end electrical switching element is configured to receive multiple data units through multiple receive ports of the receive-end electrical switching element, perform stage-1 electrical switching for the received multiple data units, and after electrical/optical conversion is performed by FTLs connected to multiple output ports of the receive-end electrical switching element, output the multiple data units to the all-optical switching element;

the all-optical switching element is configured to perform all-optical space division switching for the multiple data units output by the receive-end electrical switching element, and output the multiple data units to the transmit-end electrical switching element; and the transmit-end electrical switching element is configured to perform optical/electrical conversion, by using ORs connected to multiple receive ports of the transmit-end electrical switching element, for the multiple data units output by the all-optical switching element, and then perform stage-2 electrical switching for the multiple data units after the optical/electrical conversion, and output the multiple data units through multiple output ports of the transmit-end electrical switching element.

By using the optical burst synchronization method, line card chassis, and optical network switching node in a multi-chassis cluster provided by one aspect of the present invention, one line card chassis is selected from multiple line card chassis connected to a same all-optical switching element, as a reference chassis, and the reference chassis transmits an optical burst test signal carrying a transmission timeslot number to other line card chassis; and the other line card chassis acquire, according to optical path differences between the other line card chassis and the reference chassis, local time of receiving the optical burst test signal, and the transmission timeslot of the reference chassis side carried in the optical test signal, time-phase differences between the other line card chassis and the reference chassis, and further calibrate local clock phases based on the time-phase differences. Thereby, optical burst signals transmitted by each line card chassis and carrying a same timeslot number can arrive at the all-optical switching element simultaneously, optical burst synchronization is implemented, and further the switching manner of electrical switching-all-optical space division switching-electrical switching is implemented. The low power consumption characteristic of all-optical space division switching is fully used, and the multi-chassis cluster system based on an OTN technology is implemented. The capacity of a core node in the OTN is increased by using the multi-chassis cluster, bandwidth utilization of a transport network is improved; and the following problem in the prior art is resolved: it is difficult to expand the electrical node of the OTN because the electrical node of the OTN is constrained by factors such as the total power consumption of the cabinet, heat dissipation, and bearing capacity of the equipment room.

By using the optical burst synchronization method, line card chassis, and optical network switching node in a multi-chassis cluster provided by another aspect of the present invention, one line card chassis is selected from multiple line card chassis connected to a same all-optical switching element, as a reference chassis, and other line card chassis respectively transmit an optical burst test signal carrying a transmission timeslot number to the reference chassis; and the reference chassis acquires, according to optical path differences between the reference chassis and the other line card chassis, time of receiving the optical burst test signal, and the transmission timeslot carried in the optical burst test signal, time-phase differences between the reference chassis and the other line card chassis, and feeds back the acquired time-phase differences to the other line card chassis. Thereby, the other line card chassis calibrate local clock phases according to the time-phase differences, optical burst signals transmitted by each line card chassis and carrying a same timeslot number can arrive at the all-optical switching element simultaneously, optical burst synchronization is implemented, and further the switching manner of electrical switching-all-optical space division switching-electrical switching is implemented. The low power consumption characteristic of all-optical space division switching is fully used, and the multi-chassis cluster system based on an OTN technology is implemented. The capacity of a core node in the OTN is increased by using the multi-chassis cluster, bandwidth utilization of a transport network is improved; and the following problem in the prior art is resolved: it is difficult to expand the electrical node of the OTN because the electrical node of the OTN is constrained by factors such as the total power consumption of the cabinet, heat dissipation, and bearing capacity of the equipment room.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
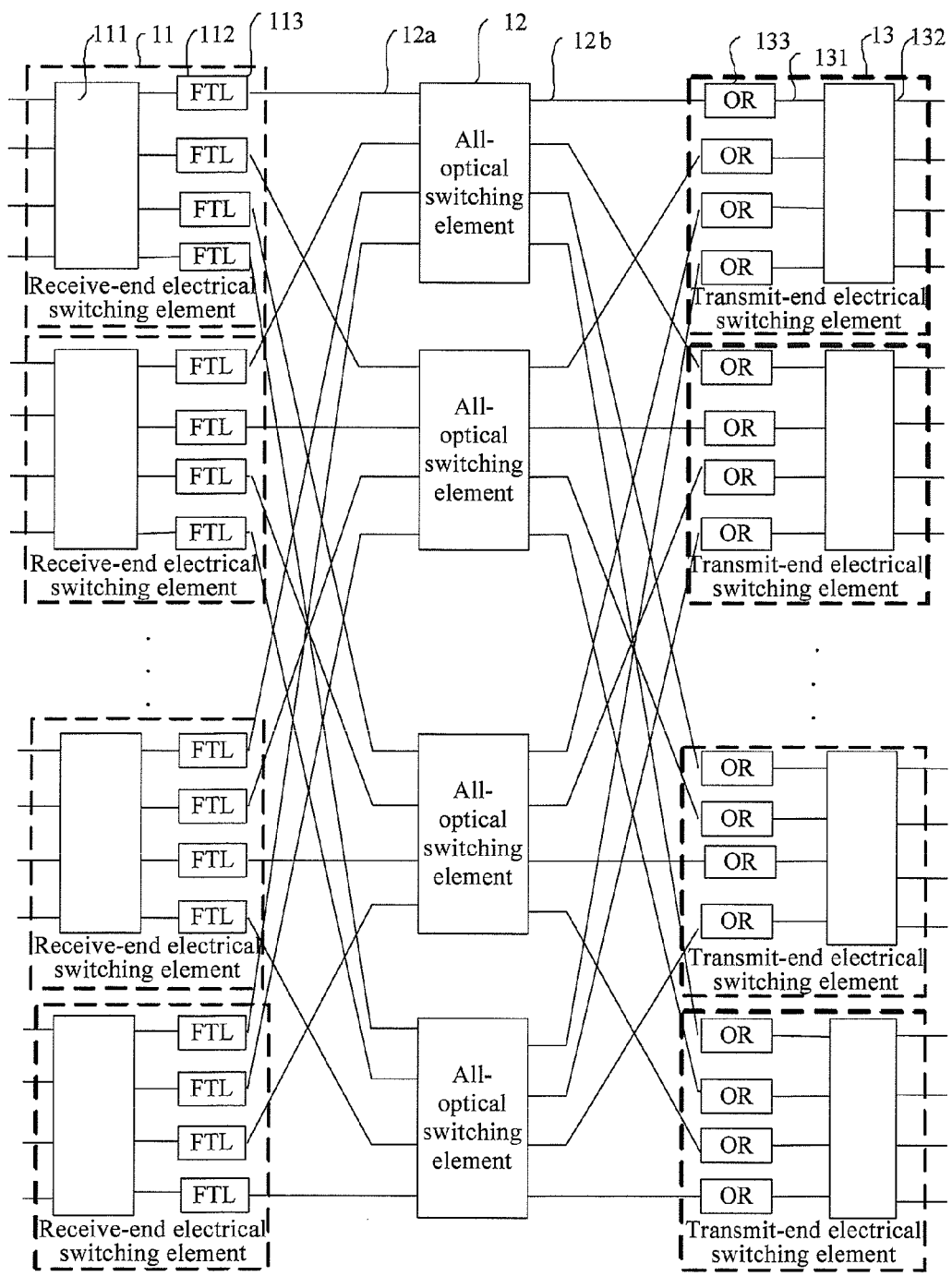
FIG. 1 is a schematic structural diagram of an optical network switching node in a multi-chassis cluster according to an embodiment of the present invention.

FIG. 1 is a schematic structural diagram of an optical network switching node in a multi-chassis cluster according to an embodiment of the present invention. As shown in FIG. 1, the optical network switching node of this embodiment includes: at least one receive-end electrical switching element 11, at least one all-optical switching element 12, and at least one transmit-end electrical switching element 13. The receive-end electrical switching element 11 and corresponding transmit-end electrical switching element 13 are located in a line card chassis.

Each receive-end electrical switching element 11 includes multiple receive ports 111, multiple output ports 112, and a wavelength fast tunable optical transmission laser (Fast Tunable Laser, FTL for short) 113 connected to each output port 112; for receive-end electrical switching elements 11, the number of receive ports 111, that of output ports 112, and that of FTLs 113 are the same, and mapping exists between the receive ports 111 and output ports 112 of each receive-end electrical switching element 11. Each transmit-end electrical switching element 13 includes multiple receive ports 131, multiple output ports 132, and an optical receiver (Optical Receiver, OR for short) 133 connected to each receive port 131; for transmit-end electrical switching elements 13, the number of receive ports 131, that of output ports 132, and that of ORs 133 are the same, and mapping exists between the receive ports 131 and output ports 132 of each transmit-end electrical switching element 13. In FIG. 1, each receive-end electrical switching element 11 includes 4 receive ports 111, 4 output ports 112, and an FTL 113 connected to each output port 112. The 4 receive ports 111 are respectively: a first receive port, a second receive port, a third receive port, and a fourth receive port; the 4 output ports 112 respectively include: a first output port, a second output port, a third output port, and a fourth output port. Each transmit-end electrical switching element 13 includes 4 receive ports 131, 4 output ports 132, and an OR 133 connected to each receive port 131. The 4 receive ports 131 are also respectively: a first receive port, a second receive port, a third receive port, and a fourth receive port; the 4 output ports 132 respectively include: a first output port, a second output port, a third output port, and a fourth output port. Numbers corresponding to all first receive ports are the same and are 1; numbers corresponding to all second receive ports are the same and are 2; numbers corresponding to all third receive ports are the same and are 3; and numbers corresponding to all fourth receive ports are the same and are 4. Likewise, numbers respectively corresponding to all first output ports, all second output ports, all third output ports, and all fourth output ports are also the same, and are 1, 2, 3, and 4 respectively.

Other circuits are further included between the receive ports 111 and the output ports 112 of the receive-end electrical switching element 11, and other circuits are further included between the receive ports 131 and the output ports 132 of the transmit-end electrical switching element 13, where each circuit is indicated by a "rectangular box".

Each all-optical switching element 12 includes multiple input ends 12a and multiple output ends 12b. The number of input ends 12a is the same as the number of output ends 12b, and mapping exists between the input ends 12a and the output ends 12b.

Each output port 112 of each receive-end electrical switching element 11 is connected, by using an FTL 113 connected to the output port 112, to an input end 12a of the all-optical switching element 12, and each receive port 131 of each transmit-end electrical switching element 13 is connected, by using an OR 133 connected to the receive port 131, to an output port 12b of the all-optical switching element 12.

Each receive-end electrical switching element 11 is configured to receive multiple data units through multiple receive ports 111 of the receive-end electrical switching element 11, perform stage-1 electrical switching for the received multiple data units, and after electrical/optical conversion is performed by FTLs 113 connected to multiple output ports 112 of the receive-end electrical switching element 11, output the multiple data units to the all-optical switching element 12. The all-optical switching element 12 is configured to receive, through the input ends 12a of the all-optical switching element 12, multiple data units after the electrical/optical conversion that are output by the receive-end electrical switching element 11, perform all-optical space division switching for the received multiple data units after the electrical/optical conversion, and then output the multiple data units to the transmit-end electrical switching element 13 through the output ends 12b of the all-optical switching element 12. The transmit-end electrical switching element 13 is configured to receive, through the multiple receive ports 131 and the ORs 133 connected to the receive ports 131 of the transmit-end electrical switching element 13, the multiple data units output by the all-optical switching element 12, perform optical/electrical conversion for the multiple data units output by the all-optical switching element 12, and then perform stage-2 electrical switching for the multiple data units after the optical/electrical conversion, and output the multiple data units through multiple output ports 132 of the transmit-end electrical switching element 13.

By using the optical network switching node in the multi-chassis cluster provided by this embodiment, the switching manner of electrical switching-all-optical space division switching-electrical switching is used, and the low power consumption characteristic of all-optical space division switching is fully used. The multi-chassis cluster system based on an OTN technology is implemented. The capacity of a core node in the OTN is increased by using the multi-chassis cluster, bandwidth utilization of a transport network is improved; and the following problem in the prior art is resolved: it is difficult to expand the electrical node of the OTN because the electrical node of the OTN is constrained by factors such as the total power consumption of the cabinet, heat dissipation, and bearing capacity of the equipment room.

Figure 2:
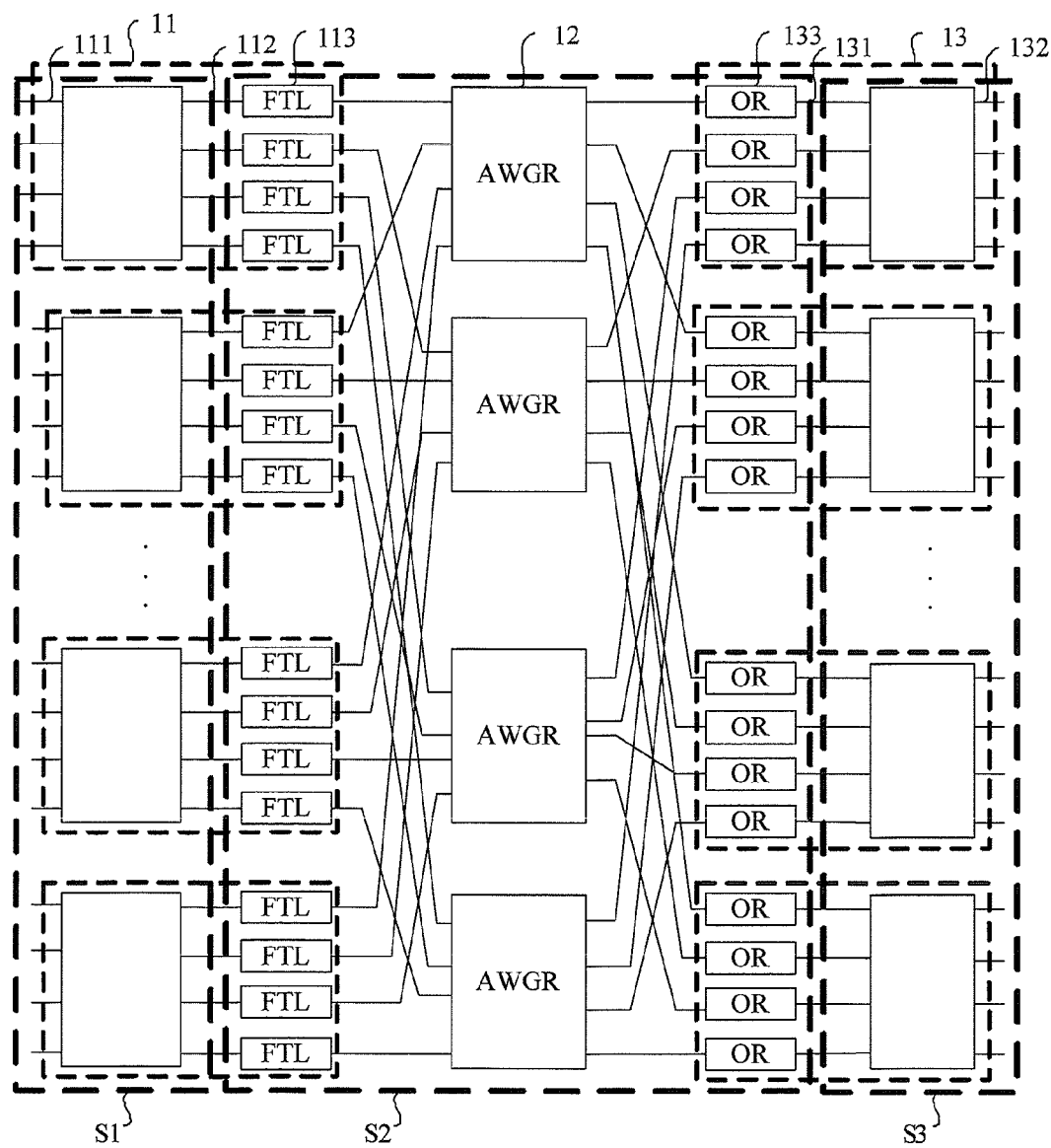
FIG. 2 is a schematic structural diagram of an optical network switching node in a multi-chassis cluster according to another embodiment of the present invention.

FIG. 2 is a schematic structural diagram of an optical network switching node in a multi-chassis cluster according to another embodiment of the present invention. This embodiment is implemented based on the embodiment shown in FIG. 1. As shown in FIG. 2, an all-optical switching element 12 of this embodiment is an AWGR.

Specifically, an output port 112 of each receive-end electrical switching element 11 is connected, by using an FTL 113 connected to the output port 112, to an input end of an AWGR 12, and a receive port 131 of each transmit-end electrical switching element 13 is connected, by using an OR 133 connected to the receive port 131, to an output end of an AWGR 12. Output ports 112 with same numbers, in all receive-end electrical switching elements 11, are respectively connected, by using FTLs 113 connected to the output ports 112, to different input ends of the same AWGR 12. As shown in FIG. 2, first output ports in all receive-end electrical switching elements 11 are connected, by using FTLs connected to the first output ports, to different input ends of the first AWGR 12, and second output ports in all receive-end electrical switching element 11s are connected, by using FTLs connected to the second output ports, to different input ends of the second AWGR 12, and so on. Receive ports 131 with same numbers, in all transmit-end electrical switching elements 13, are respectively connected, by using ORs 133 connected to the receive ports 131, to different output ends of the same AWGR 12. In addition, numbers of output ports 112 with same numbers, in all receive-end electrical switching elements 11 and connected to different input ends of the AWGR 12, are the same as numbers of receive ports 131 with same numbers, in all transmit-end electrical switching elements 13 and connected to different output ends of the AWGR 12. As shown in FIG. 2, first receive ports in all transmit-end electrical switching elements 13 are connected, by using ORs connected to the first receive ports, to different output ends of the first AWGR 12, and second receive ports in all transmit-end electrical switching elements 13 are connected, by using ORs connected to the second receive ports, to different output ends of the second AWGR 12, and so on.

In this embodiment, the output port 112 of the receive-end electrical switching element 11 to which the FTL 113 is connected (output port 112 corresponding to the FTL 113 for short) is mainly responsible for generating an electrical burst signal, transmitting the electrical burst signal with reference to the clock time, performing electrical control for the wavelength of the FTL after electrical/optical conversion is performed by the FTL 113, and so on. The receive port 131 of the transmit-end electrical switching element 13 to which the OR 133 is connected (receive port 131 corresponding to the OR 133 for short) is mainly responsible for converting an optical wave signal into an electrical signal, and so on. The FTL 113 is connected to the AWGR 12 by using an optical fiber, and the AWGR 12 is connected to the OR 133 by using an optical fiber. Therefore, an upstream optical wave signal from the FTL 113 is transmitted to the AWGR 12 through an upstream optical fiber, and a downstream optical wave signal output from the AWGR 12 is transmitted to the OR 133 through a downstream optical fiber. In specific implementation, each receive port 111 in the receive-end electrical switching element 11 receives multiple data units, and performs stage-1 electrical switching for the received multiple data units. Then, each output port 112 outputs the multiple data units to the FTL 113 connected to the output port 112. The FTL 113 performs electrical/optical conversion for an electrical time division burst data unit after the stage-1 electrical switching to form a time division optical burst signal, and transmits the time division optical burst signal to the all-optical switching element 12, namely, the AWGR 12. Each AWGR 12 is configured to switch time division optical burst signals from different FTLs 113 in a same timeslot to different output ends to transmit the time division optical burst signals to different transmit-end electrical switching elements 13. The transmit-end electrical switching element 13 first receives, by using the OR 133, the time division optical burst signal transmitted by the AWGR 12, converts the time division optical burst signal into an electrical time division burst data unit, and then transmits the electrical time division burst data unit to the receive port 131 connected to the OR 133; then performs stage-2 electrical switching, and finally outputs the electrical time division burst data unit through the corresponding output port 132 of the transmit-end electrical switching element 13, so that the electrical time division burst data unit leaves the cluster node.

In an actual application process, the optical network switching node of this embodiment may correspond to a Charles stage-3 network logically. For example, a part of the receive-end electrical switching element 11 (a part except the FTL) may be stage 1 (Stage 1, S1 for short) of the Charles stage-3 network (namely, a 3-stage CLOS switching network); a part of the transmit-end electrical switching element 13 (a part except the OR) may be stage 3 (Stage 3, S3 for short) of the 3-stage CLOS switching network; the middle all-optical switching element 12, in combination with the FTL in the receive-end electrical switching element 11 and the OR in the transmit-end electrical switching element 13 may be stage 2 (Stage 2, S2 for short) of the 3-stage CLOS switching network. The electrical time division burst data unit in this embodiment may be an ODU-k signal. The S1 and S3 may implement electrical domain switching of the ODU-k signal, where k may be any integer from 0 to 4. For example, the receive ports of the S1 and S3 (namely, the receive port 111 of the receive-end electrical switching element 11 and the receive port 131 of the transmit-end electrical switching element 13) may transmit an ODU-2 or OTU-2 signal, and may also transmit an ODU-3 or OTU-3 signal. Furthermore, when each S1 and each S3 include 4 receive ports respectively, the 4 receive ports may all transmit an ODU-2 or OTU-2 signal, or one of the 4 receive ports transmits an ODU-3 or OTU-3 signal, and the other receive ports transmit an ODU-2 or OTU-2 signal. In specific implementation, the S1 may demultiplex the lower-level signal data units in an ODU-k signal, the minimum of which is an ODU-0, and perform non-blocking full switching. Upon completion of switching in the S1, the output port corresponding to the FTL in the S2 completes burst encapsulation for each ODU-k signal, and the FTL in the S2 transmits the ODU-k signal to the AWGR so that the S2 performs all-optical switching. Correspondingly, the receive port corresponding to the OR in the S2 completes decapsulation of the ODU-k signal after burst encapsulation. The ODU-k signal undergoes non-blocking full switching, and is encapsulated to a high-order ODU-k/OTU-k, and then leaves the cluster node through a standard OTN interface.

The AWGR is a common core passive optical switching component in an all-optical switching system. The main characteristic of the AWGR is that: when an optical burst signal of a wavelength is input by an input end of the AWGR, from which output end the optical burst signal is output depends on the wavelength of the optical burst signal itself. For example, optical burst signals of different wavelengths input by the first input end of the AWGR are output from different output ends of the AWGR, and wavelengths of optical burst signals output to a same output end are also different. For a 4×4 AWGR of multiple repetition periods (n+1), where n≥0, the space division switching characteristic of optical burst signals of different wavelengths is shown in Table 1.

TABLE 1

| | First Output End | Second Output End | Third Output End | Fourth Output End |
|---|---|---|---|---|
| First Input End | $\lambda 1 \lambda 5 \ldots \lambda 4n+1$ | $\lambda 2 \lambda 6 \ldots \lambda 4n+2$ | $\lambda 3 \lambda 7 \ldots \lambda 4n+3$ | $\lambda 4 \lambda 8 \ldots \lambda 4n+4$ |
| Second Input End | $\lambda 4 \lambda 8 \ldots \lambda 4n+4$ | $\lambda 1 \lambda 5 \ldots \lambda 4n+1$ | $\lambda 2 \lambda 6 \ldots \lambda 4n+2$ | $\lambda 3 \lambda 7 \ldots \lambda 4n+3$ |
| Third Input End | $\lambda 3 \lambda 7 \ldots \lambda 4n+3$ | $\lambda 4 \lambda 8 \ldots \lambda 4n+4$ | $\lambda 1 \lambda 5 \ldots \lambda 4n+1$ | $\lambda 2 \lambda 6 \ldots \lambda 4n+2$ |
| Fourth Input End | $\lambda 2 \lambda 6 \ldots \lambda 4n+2$ | $\lambda 3 \lambda 7 \ldots \lambda 4n+3$ | $\lambda 4 \lambda 8 \ldots \lambda 4n+4$ | $\lambda 1 \lambda 5 \ldots \lambda 4n+1$ |

Using the first input end and the first output end as an example, Table 1 is described. Optical burst signals of wavelengths $\lambda 1, \lambda 5, \ldots,$ and $\lambda 4n+1$ input at the first input end are respectively output at the first output end. The relationship between other input ends and output ends may be similar to the relationship between the first input end and the first output end. In addition, as seen from Table 1 transversely, it is analyzed that wavelengths of optical burst signals output respectively by the first output end to the fourth output end are visible, and that wavelengths of the optical burst signals output by each output end are all different.

The AWGR is widely used in a wavelength division multiplexing (Wavelength Division Multiplexing, WDM for short) or dense wavelength division multiplexing (Dense Wavelength Division Multiplexing, DWDM for short) network to implement switching at a wavelength level. The corresponding switching bandwidth granularities are usually 10 Gbps, 40 Gbps, and 100 Gbps large-granularity bandwidths. This embodiment, by applying the AWGR to a multi-chassis cluster system as an all-optical switching element in the multi-chassis cluster system, implements a 3-stage switching manner of electrical switching-all-optical space division switching-electrical switching, fully uses the advantage of a large bandwidth granularity owned by the AWGR, and implements the multi-chassis cluster system of all-optical switching. In addition, because the AWGR uses a passive optical component to implement switching, the AWGR has low power consumption. Different from the electrical switching node, the AWGR is not constrained by factors such as power consumption and heat dissipation, and is more flexible than the electrical switching node, which further ensures development of the multi-chassis cluster system and lays a basis for meeting the growing traffic requirement of the Internet.

In an actual implementation process, a receive-end electrical switching element 11 and a transmit-end electrical switching element 13 in the transport network system in a multi-chassis cluster provided by the foregoing embodiment, as the upstream and downstream parts of the electrical switching element (line card chassis), form an electrical switching node element in a complete sense, and are generally deployed in a line card chassis. Logically, an S1, an FTL connected to the S1, an S3, and an ROSA (Receiver Optical Sub-Assembly) connected to the S3 are deployed in the line card chassis; and the AWGR 12 in the all-optical switching element 12 is generally deployed in a central cross-connect chassis. A cross-connection between the AWGR 12 and the FTL 121 is determined by the wavelength of an optical burst signal output by the FTL 113, that is, control of the cross-connection in the all-optical switching element 12 is actually a process of controlling the wavelength configuration of optical burst signals of different wavelengths converted by the FTL. For a transport network cluster system having 200 line card chassis, each AWGR receives optical burst signals transmitted by 200 FTLs. If the time when each optical burst signal arrives at the AWGR does not match local time of the AWGR, optical burst signals after space division switching is performed by the AWGR may overlap and collide (that is, different burst signals of the same wavelength overlap and arrive at the OR at the same time, and therefore, the OR cannot correctly receive and process the signals). As a result, the transmit-end electrical switching element cannot implement time division reception, resulting in a system transmission failure. Alternatively, multiple receivers need to be deployed before the receive-end electrical switching element to perform wavelength division reception, but this increases the complexity and cost of the system.

As seen above, for the optical network switching node in the multi-chassis cluster, the problem of synchronization between optical burst signals is a major problem facing the optical network switching node in the multi-chassis cluster provided by the embodiment of the present invention. Synchronization between optical burst signals is called optical burst synchronization. The following describes the optical burst synchronization by using an example in which all-optical switching is performed for a minimum granularity ODU-0 included in an ODU-2 in a part of the structure in the optical network switching node of the multi-chassis cluster shown in FIG. 3.

First, assuming that an optical burst data unit transmitted by an FTL to an optical fiber line (optical path for short) uses 3 as a period, that is, each burst data packet is encapsulated with a data stream of one ODU-0. Every 3 consecutive optical bursts form a frame, and each optical burst corresponds to one timeslot, that is, one frame includes 3 timeslots. If n frames form a multiframe, a multiframe includes 3×n timeslots, and may bear 3×n optical burst signals.

Figure 3:
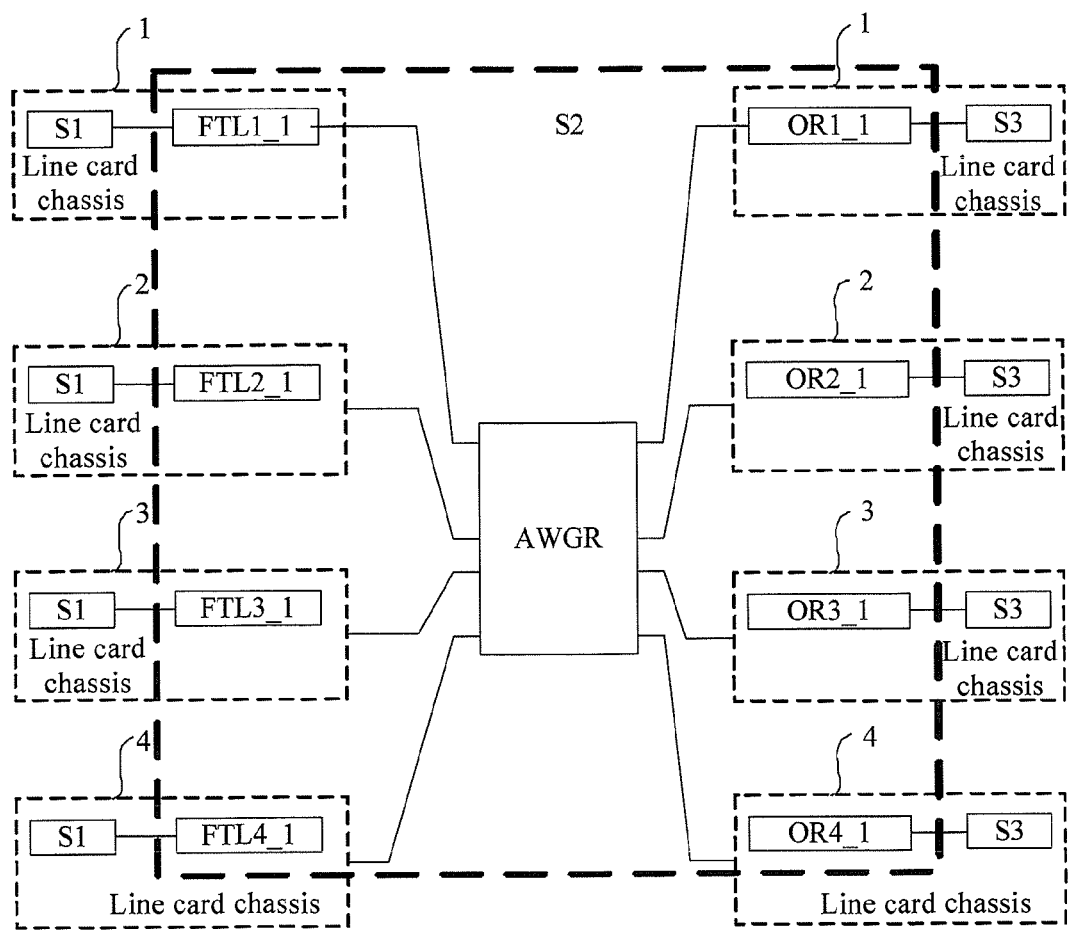
FIG. 3 is a partial schematic structural diagram of an optical network switching node in a multi-chassis cluster according to an embodiment of the present invention.

FIG. 3 shows only 4 line card chassis, which are respectively line card chassis 1, 2, 3, and 4. Each line card chassis includes an S1, an S3, an FTL, and an OR. FIG. 3 shows only FTLs and ORs numbered 1 in each line card chassis, which are respectively FTL1_1, FTL2_1, FTL3_1, and FTL4_1, and OR1_1, OR2_1, OR3_1, and OR4_1. The FTL1_1, FTL2_1, FTL3_1, and FTL4_1 are connected to the input ends of the AWGR in sequence, and the OR1_1, OR2_1, OR3_1, and OR4_1 are connected to the output ends of the AWGR in sequence.

Optical burst signals transmitted by each FTL in a same timeslot of a same frame in a same multiframe are required to arrive at the AWGR at the same time. If the optical burst signals transmitted by each FTL in the same timeslot of the same frame in the same multiframe do not arrive at the AWGR at the same time, it indicates that optical bursts are not synchronized; otherwise, it indicates that optical bursts are synchronized. For ease of describing optical burst synchronization, reference time needs to be defined. Any one FTL or AWGR may be used as a reference point, and local time of the reference point is used as reference time. Other FTLs or AWGRs are aligned with the reference time. After the reference point is selected, a local time of the reference point is used as a reference. When an optical burst signal transmitted by the reference point and carrying a timeslot number corresponding to the time of the reference point for indicating a specific reference time phase arrives at a place A, the local time corresponding to the timeslot number carried by the signal, at the reference point is recorded as local time of the place A referencing the reference time (or when an optical burst signal transmitted by the place A and carrying a specific timeslot number for indicating a specific phase arrives at the reference point, if the timeslot number and the arrival time are consistent with the time of the reference point, local time of the place A when the signal is transmitted by the place A is local time of the place A referencing the reference time), that is, arrival time at the place A on an optical path of the optical burst signal referencing the reference time is local time of the place A referencing the reference time (the difference between the local time and the reference time at the reference point is equal to time consumed by the optical signal in transmission from the reference point to the place A).

For ease of description, this example uses local time of the AWGR as reference time. As shown in FIG. 3, if upstream optical paths and downstream optical paths between line card chassis 1, 2, 3 and 4 and the AWGR are all determined, and the transmission speed of optical burst signals is also determined, at a particular time, local time of the S1 and S3 in line card chassis 1, 2, 3, and 4 at the AWGR is consistent with reference time of the AWGR (namely, local time of the AWGR), and therefore optical burst signals transmitted by the output port corresponding to the FTL of each line card chassis by referencing respective local time, arrive at the same time of the local time of the AWGR, which meets the system requirement of burst signal synchronization requirement.

For example, it is assumed that: the upstream time difference between the FTL1_1 and the AWGR is 6.3 optical timeslots, the upstream time difference between the FTL2_1 and the AWGR is 7 optical timeslots, the upstream time difference between the FTL3_1 and the AWGR is 5.7 optical timeslots, and the upstream time difference between the FTL4_1 and the AWGR is 7.4 optical timeslots. Meanwhile, it is assumed that the wavelength configuration of each FTL is shown in Table 2.

TABLE 2

| Timeslot and Wavelength Configuration Table of the FTL | | | OR1_1 | OR2_1 | OR3_1 | OR4_1 |
|---|---|---|---|---|---|---|
| FTL1_1 | First timeslot | OR3_1 λ2 | λ0 | λ1 | λ2 | λ3 |
| | Second timeslot | OR2_1 λ1 | λ0 | λ1 | λ2 | λ3 |
| | Third timeslot | OR4_1 λ3 | λ0 | λ1 | λ2 | λ3 |
| FTL2_1 | First Timeslot | Idle (Idle) | λ3 | λ0 | λ1 | λ2 |
| | Second Timeslot | OR1_1 λ3 | λ3 | λ0 | λ1 | λ2 |
| | Third Timeslot | Idle (Idle) | λ3 | λ0 | λ1 | λ2 |

TABLE 2-continued

| Timeslot and Wavelength Configuration Table of the FTL | | | OR1_1 | OR2_1 | OR3_1 | OR4_1 |
|---|---|---|---|---|---|---|
| FTL3_1 | First timeslot | OR1_1 $\lambda 2$ | $\lambda 2$ | $\lambda 3$ | $\lambda 0$ | $\lambda 1$ |
| | Second timeslot | Idle (Idle) | $\lambda 2$ | $\lambda 3$ | $\lambda 0$ | $\lambda 1$ |
| | Third timeslot | Idle (Idle) | $\lambda 2$ | $\lambda 3$ | $\lambda 0$ | $\lambda 1$ |
| FTL4_1 | First timeslot | Idle (Idle) | $\lambda 1$ | $\lambda 2$ | $\lambda 3$ | $\lambda 0$ |
| | Second timeslot | Idle (Idle) | $\lambda 1$ | $\lambda 2$ | $\lambda 3$ | $\lambda 0$ |
| | Third timeslot | OR1_1 $\lambda 1$ | $\lambda 1$ | $\lambda 2$ | $\lambda 3$ | $\lambda 0$ |

As seen from Table 2, the FTL1_1 is configured with the following wavelength and connection relationships: (1) A sub-wavelength connection based on the first timeslot, from the line card chassis 1 that is connected to the first input end of the AWGR by using the FTL1_1, to the third output end (namely, the OR3_1) of the AWGR, to the line card chassis 3, is established and a reverse connection from the line card chassis 3 to the line card chassis 1 is established. (2) A sub-wavelength connection based on the second timeslot, from the line card chassis 1 that is connected to the first input end of the AWGR by using the FTL1_11, to the second output end (namely, the OR2_1) of the AWGR, to the line card chassis 2, is established, and a reverse connection from the line card chassis 2 to the line card chassis 1 is established. (3) A sub-wavelength connection based on the third timeslot, from the line card chassis 1 that is connected to the first input end of the AWGR by using the FTL1_1, to the fourth output end (namely, the OR4_1) of the AWGR, to the line card chassis 4, is established, and a reverse connection from the line card chassis 4 to the line card chassis 1 is established. Other FTLs are similar to this, where idle indicates that no connection is established in the timeslot.

Based on the foregoing description, to implement burst synchronization, a time relationship for transmitting a burst signal by each FTL is as follows: assuming that at a particular time, the FTL1_11 which is 6.3 optical timeslots away from the AWGR on an optical path is transmitting an optical burst signal of a first timeslot of a second frame in an $(N+1)^{th}$ multiframe, the FTL2_1 which is 7.0 optical timeslots away from the AWGR on the optical path has transmitted an optical burst signal of the first timeslot of the second frame in the $(N+1)^{th}$ multiframe, and is ready to transmit an optical burst signal of a next frame; the FTL3_1 which is 5.7 optical timeslots away from the AWGR on the optical path is transmitting an optical burst signal of a third timeslot of a first frame in the $(N+1)^{th}$ multiframe; and the FTL4_1 which is 7.4 optical timeslots away from the AWGR on the optical path is transmitting an optical burst signal of a second timeslot of the second frame in the $(N+1)^{th}$ multiframe. As seen above, an optical transmission delay of the optical path from each FTL to the AWGR and local time of each FTL form reasonable compensation matching. At the AWGR, a third timeslot of a next to last frame in an $N^{th}$ multiframe coming from each FTL has traversed the AWGR, and an optical burst signal of a first timeslot of a last frame in the $N^{th}$ multiframe coming from each FTL is arriving.

In each embodiment of the present invention, if local time of the FTL1_1 at the AWGR, local time of the FTL2_1 at the AWGR, local time of the FTL3_1 at the AWGR, and local time of the FTL4_1 at the AWGR, namely, local time of the four FTLs at the AWGR, is the same, optical burst synchronization is implemented.

Based on the foregoing implementation of synchronization, even if the optical burst signals pass through different optical paths after space division switching is completed on the AWGR, local time at each OR is also synchronized. Therefore, the problem that the burst signals overlap and collide does not exist.

For the optical burst synchronization problem in all-optical switching, the prior art also has several solutions. For example, centralized unified time distribution and clock distribution are used to implement synchronization of the optical burst signal of each chassis. However, this requires that the time distribution system in use should match the optical path from each FTL/OR to the AWGR, which is difficult in engineering. Generally, centralized unified time distribution and clock distribution are only applicable to a small-sized single-chassis node equipment. In a multi-chassis node scenario, the distribution delay and signal transmission delay between chassis are distributed at random, and implementation of the unified clock and phase is relatively difficult. Alternatively, a buffer device implemented by an optical delay line is added to the front end of the switching equipment (AWGR) where the optical burst signal arrives, and optical switching is performed after alignment, and the optical burst signal is transmitted in the next timeslot after unified strict synchronization. The optical buffer storage component is immature and expensive. The optical buffer using an optical fiber as a basic delay component has a limited buffer capacity, is large and expensive, and is especially inapplicable to a multi-chassis cluster system. For another example, the prior art further has a solution that uses an electrical memory buffer to replace an optical delay line buffer, but the solution requires first optical/electrical conversion, then electrical storing, and then electrical/optical conversion for outputting to the next stage. Due to complex processing, a high cost, and high power consumption, the solution is also inapplicable to the multi-chassis cluster system that is sensitive to power consumption.

As seen from the foregoing analysis, various methods for implementing optical burst synchronization in the prior art are all inapplicable to the multi-chassis cluster system. Therefore, the following embodiments of the present invention provide solutions for optical burst synchronization of a large-capacity optical network switching node in a multi-chassis cluster implemented based on FTLs and AWGRs.

Figure 4:
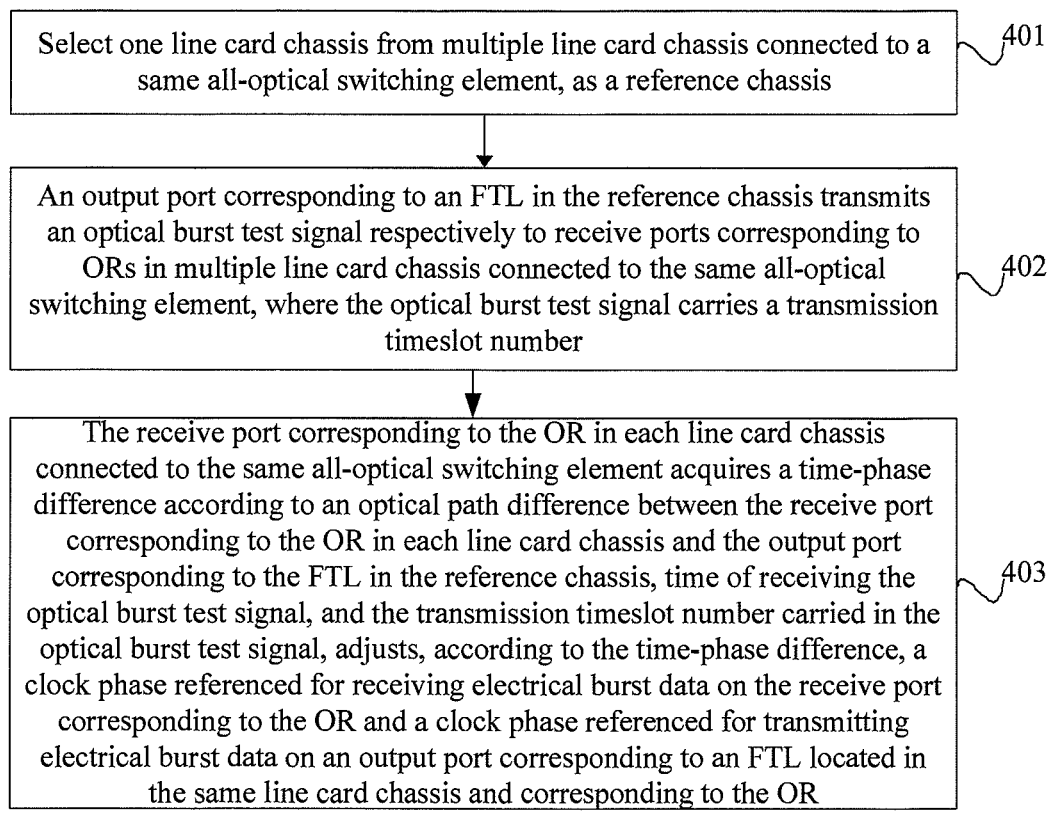
FIG. 4 is a flowchart of an optical burst synchronization method according to an embodiment of the present invention.

FIG. 4 is a flowchart of an optical burst synchronization method according to an embodiment of the present invention. As shown in FIG. 4, the optical burst synchronization method of this embodiment includes:

Step 401: Select one line card chassis from multiple line card chassis connected to a same all-optical switching element, as a reference chassis.

This embodiment uses an example in which an all-optical switching element is an AWGR.

The synchronization in this embodiment means that all optical burst signals that are transmitted by all chassis to a same AWGR by using FTLs and carry a same timeslot number arrive at the AWGR at the same time. Therefore, each AWGR is described in this embodiment. As shown in FIG. 3, 4 line card chassis are connected to a same AWGR. In this embodiment, any one line card chassis may be selected as a reference chassis.

Step 402: An output port corresponding to an FTL in the reference chassis transmits an optical burst test signal respectively to receive ports corresponding to ORs in multiple line card chassis connected to the same all-optical switching element, where the optical burst test signal carries a transmission timeslot number.

In this embodiment, a corresponding FTL and OR connected to the same AWGR are located in a same line card chassis, as shown in FIG. 3. The output port corresponding to the FTL in the reference chassis may transmit, one by one in different burst overhead timeslots, an optical burst test signal to multiple line card chassis (including the reference chassis) connected to the same AWGR; the receive port corresponding to the OR in each line card chassis receives the optical burst test signal in different burst overhead timeslots.

In this embodiment, using time of the reference chassis as a reference, all line card chassis are aligned with time of the reference chassis. For aligning the OR in each line card chassis with the reference chassis, the output port corresponding to the FTL in the reference chassis carries the transmission timeslot number of the optical burst test signal, in the transmitted optical burst test signal. Because transmission of various optical burst signals in the whole system uses the burst timeslot as a reference, in this embodiment, the transmission timeslot number is directly carried to indicate at which time the optical burst test signal is transmitted on the output port corresponding to the FTL in the reference chassis.

Step 403: The receive port corresponding to the OR in each line card chassis connected to the same all-optical switching element acquires, according to an optical path difference between the receive port corresponding to the OR in each line card chassis and the output port corresponding to the FTL in the reference chassis, time of receiving the optical burst test signal, and the transmission timeslot number carried in the optical burst test signal, a difference (namely, a time-phase difference) between a local time phase referenced for receiving an electrical burst signal on the receive port corresponding to the OR and the reference time phase indicated by the optical burst signal transmitted by the reference chassis by using the FTL, adjusts, according to the time-phase difference, a clock phase referenced for receiving electrical burst data on the receive port corresponding to the OR, and adjusts, according to an optical path difference between the OR to the corresponding FTL located in a same line card chassis, a clock phase referenced for transmitting electrical burst data on an output port corresponding to an FTL located in the same line card chassis and corresponding to the OR. Simply, the receive port corresponding to the OR aligns time of the local clock with time indicated by arrival time of the reference burst signal carrying the reference timeslot number, and correspondingly calibrates the clock referenced for transmitting the burst data on the transmit port corresponding to the FTL, to correct time.

When the receive port corresponding to the OR in each line card chassis connected to the same AWGR receives an optical burst test signal, the receive port records time of receiving the optical burst test signal, namely, time when the optical burst test signal corresponding to the local clock referenced for receiving the electrical burst data by the receive port corresponding to the OR, arrives at the OR. The arrival time is specifically indicated by the value (timeslot/pulse) of the counter of the clock referenced by the OR for receiving the electrical burst data.

In this embodiment, the receive port corresponding to the OR in each line card chassis connected to the same AWGR has pre-acquired the optical path difference between the receive port corresponding to the OR in each line card chassis and the output port corresponding to the corresponding FTL in the same line card chassis, where the optical path difference is specifically transmission time required for transmitting the optical burst test signal from the output port corresponding to the FTL located in the same line card chassis and corresponding to the OR, to the receive port corresponding to the OR by using the AWGR. Generally, the optical path difference is fixed.

Based on the foregoing description, the receive port corresponding to the OR in each line card chassis acquires, according to the arrival time of the optical burst test signal, the optical path difference between the receive port corresponding to the OR and the output port corresponding to the FTL located in the same line card chassis and corresponding to the OR, and the transmission timeslot number carried in the optical burst test signal, a time-phase difference between local clock time referenced for transmitting the electrical burst data by the output port corresponding to the FTL in each line card chassis and the local clock time that is designed and expected, namely, a time difference, and calibrates the local clock time referenced for transmitting the electrical burst data by the output port corresponding to the FTL in each line card chassis, to the local clock time that is designed and expected. Therefore, time when the optical burst signal transmitted by the output port corresponding to the FTL by referencing local clock time arrives at the AWGR is the same as time when the optical burst signal that is transmitted by the output port corresponding to the FTL in the reference chassis by referencing reference time and carries the same timeslot number arrives at the AWGR.

Using an OR and a corresponding FTL in a line card chassis as an example, at the time when the receive port corresponding to the OR receives the front boundary of a burst data unit, local clock time referenced for receiving data by the receive port is consistent with time identified by the transmission timeslot number carried in the received burst signal when the output port corresponding to the FTL transmits the signal. Therefore, at the same time, the difference between the local clock time referenced by the receive port corresponding to the OR and the local clock time referenced for transmitting data by the output port corresponding to the FTL is just equal to transmission time consumed in transmission of the optical burst test signal from the output port corresponding to the FTL to the receive port corresponding to the OR.

Because the FTL corresponding to the OR and the OR are located in the same line card chassis, they may share a same local reference clock. If expected time identified by the transmission timeslot number carried in the burst signal received by the receive port corresponding to the OR from the reference chassis is inconsistent with the clock time referenced by the receive port corresponding to the OR when the signal arrives at the receive port corresponding to the OR, correspondingly, the clock referenced for transmitting data by the output port corresponding to the FTL located in the same line card chassis and corresponding to the OR is not synchronized with that of the reference chassis, and the optical burst signal transmitted by referencing the clock may collide with the optical burst signal transmitted by the output port corresponding to the FTL in the reference chassis.

Actually, the designed and expected value of the local time referenced by the receive port corresponding to the OR where the burst signal from the reference chassis arrives is indicated by the time identified by the transmission timeslot number carried in the burst signal. The receive port corresponding to the OR may be configured to adjust the count value of a time counter of the local clock referenced for receiving a signal by the receive port, and adjust the time phase of the clock referenced for receiving data by the receive port corresponding to the OR. Correspondingly, because a fixed time difference exists between the local time referenced for receiving data by the receive port corresponding to the OR and the local time referenced for transmitting data by the output port corresponding to the FTL located in the same line card chassis and corresponding to the OR, the fixed time difference is an optical path difference between the receive port corresponding to the OR and the output port corresponding to the FTL located in the same line card chassis and corresponding to the OR. Generally, the optical path difference between the receive port corresponding to the OR in the same line card chassis and the output port corresponding to the FTL may be known in advance. Therefore, the receive port corresponding to the OR may also simultaneously adjust the time-phase referenced for transmitting data by the output port corresponding to the FTL located in the same line card chassis and corresponding to the OR. Specifically, the line card chassis where the FTL/OR is located adjusts, according to the optical path difference between the receive port corresponding to the OR and the output port corresponding to the FTL located in the same line card chassis and corresponding to the OR, by referencing the local clock phase of the receive port corresponding to the OR, the clock phase of the output port corresponding to the FTL located in the same line card chassis and corresponding to the OR.

The process of adjusting the clock phase is specifically: calibrating the time of the local clock referenced by the receive port corresponding to the OR, to the designed and expected time indicated by the arrival time of the burst signal coming from the reference line card chassis and carrying a timeslot number, and further calibrating, according to the optical path difference between the receive port corresponding to the OR and the output port corresponding to the FTL located in the same line card chassis and corresponding to the OR, the time of the local clock referenced by the output port corresponding to the FTL, to the expected time.

In addition, in the optical burst synchronization method of this embodiment, a reference chassis is selected from multiple line card chassis connected to a same AWGR, and an output port corresponding to an FTL in the reference chassis references a local reference clock to transmit an optical burst test signal carrying a timeslot number to other line card chassis, so that a receive port corresponding to an OR in the other line card chassis adjusts, according to the transmission timeslot number carried in the optical burst test signal, arrival time, and an optical path difference between the receive port corresponding to the OR in the other line card chassis and an FTL located in the same line card chassis and corresponding to the OR, a local clock referenced by the receive and transmit ports corresponding to the OR and FTL. Therefore, phase alignment can be implemented between line card chassis in an optical network switching node of a multi-chassis cluster, optical burst signals transmitted by all line card chassis can arrive at the AWGR at the same time, and system synchronization is implemented, thereby resolving the collision problem caused by synchronization.

Further, in the foregoing embodiment, to improve accuracy of the optical path difference between the receive port corresponding to each OR and the output port corresponding to the FTL corresponding to each OR, before the receive port corresponding to the OR uses the optical path difference to adjust the time phase of the output port corresponding to the FTL corresponding to the OR, the output port corresponding to the FTL located in the same line card chassis and corresponding to an OR may transmit an optical burst loopback signal to the receive port corresponding to the OR, where the optical burst loopback signal carries a transmission timeslot number. The receive port corresponding to the OR acquires, according to time of receiving the optical burst loopback signal and the transmission timeslot number carried in the optical burst loopback signal, an optical path difference between the receive port corresponding to the OR and the output port corresponding to the FTL located in the same line card chassis and corresponding to the OR. However, the method for acquiring an optical path difference is not limited thereto, for example, the receive port corresponding to the OR transmits an optical burst loopback signal to the output port corresponding to the FTL corresponding to the OR.

The clock counter of each line card chassis counts time depending on the count pulses of the nominal frequency generated by a local crystal oscillator. A random difference exists between the actual frequency and the nominal frequency of the crystal oscillator. The crystal oscillator with a high frequency causes the phase to be earlier than the time phase of the reference chassis and cumulative. Especially, when the oscillation frequencies of the local clocks of the line card chassis are different, the phase difference caused by drift of the oscillation frequencies of the local clocks needs to be further suppressed. With respect to this problem, the optical burst synchronization method of this embodiment further includes a step of suppressing the phase difference caused by the drift of the oscillation frequencies of the clocks. Specifically, the receive port corresponding to the OR in each line card chassis connected to the same AWGR counts, according to a preset detection period, clock pulses generated by the receive port corresponding to the OR by referencing the frequency of the local crystal oscillator, between two or more than two (multiple) consecutively received reference optical burst test signals from the reference line card chassis, and records a count result, and adjusts, according to a difference between a variance of two consecutive count results and designed and expected values (time lengths of two or multiple multi-frame periods), the clock referenced by the receive port corresponding to the OR and the clock referenced for transmitting data by the output port corresponding to the FTL located in the same line card chassis and corresponding to the OR, and on this basis, performs pulse deletion/insertion carry control for the counter counting clock pulses of the frequency generated by the local crystal oscillator. The optical burst test signal is transmitted periodically. The transmission period of the optical burst test signal is generally smaller than the phase detection period (two or multiple reference burst signal periods are consecutive detection periods). For example, the transmission period of the optical burst test signal is in milliseconds, but the phase detection period is generally in seconds. That is, at regular intervals, the oscillation frequency of the local clock needs to be compared with the frequency of the reference chassis, so that the frequency difference and change of the difference (drift) are detected. According to the detection result, the number of specific pulses controlled by the pulse deletion/insertion is updated, and the difference between the frequencies of the crystal oscillators that the clock counting in each line card chassis and reference chassis depends on is updated and compensated in real time. An obvious frequency difference may be compensated by pulse deletion/insertion. For a slight difference that can hardly be compensated by pulse deletion/insertion, it is ensured that a recognizable phase difference caused by the drift of the oscillation frequencies of the local clocks is calibrated and compensated according to a preset phase detection period at regular intervals.

Specifically, each line card chassis may use clock pulses generated by the oscillation frequencies of the local clocks based on a high frequency to count local clock pulses between two or multiple optical burst test signals from the reference chassis (a higher frequency indicates that the difference and drift can be detected more precisely). If the count results between arrival time of two or multiple (n is greater than or equal to 2) consecutive optical burst test signals are the same and consistent with the design and expectation, it indicates that the oscillation frequencies of the local clocks comply with the design and expectation and does not drift, and that no additional phase difference is generated due to drift. If the count results between arrival time of two or multiple (n is greater than or equal to 2) consecutive optical burst test signals are different and do not comply with the design and expectation, it indicates that the oscillation frequencies of the local clocks are different from the frequency of the reference chassis, and that the difference is changing (drift occurs). In this case, according to the difference between the latest count result and the designed and expected value, compensation absorption adjustment of the frequency difference is implemented by performing pulse deletion or pulse insertion for the counter that counts the local clock to generate local time. For the line card chassis whose phase is earlier than the time phase of the reference chassis and cumulative due to the high frequency of a crystal oscillator, pulse insertion processing may be performed for the time phase of the line card chassis, so that the counter of the line card chassis performs a carry after counting several more pulses. Thereby, compensation can be implemented for the difference between the frequency of the crystal oscillator and the frequency of the crystal oscillator of the reference chassis. Otherwise, pulse deletion is performed for the time phase of the line card chassis, so that the counter performs a carry after counting fewer pulses. Accuracy of phase synchronization may be further improved in this manner.

Figure 5:
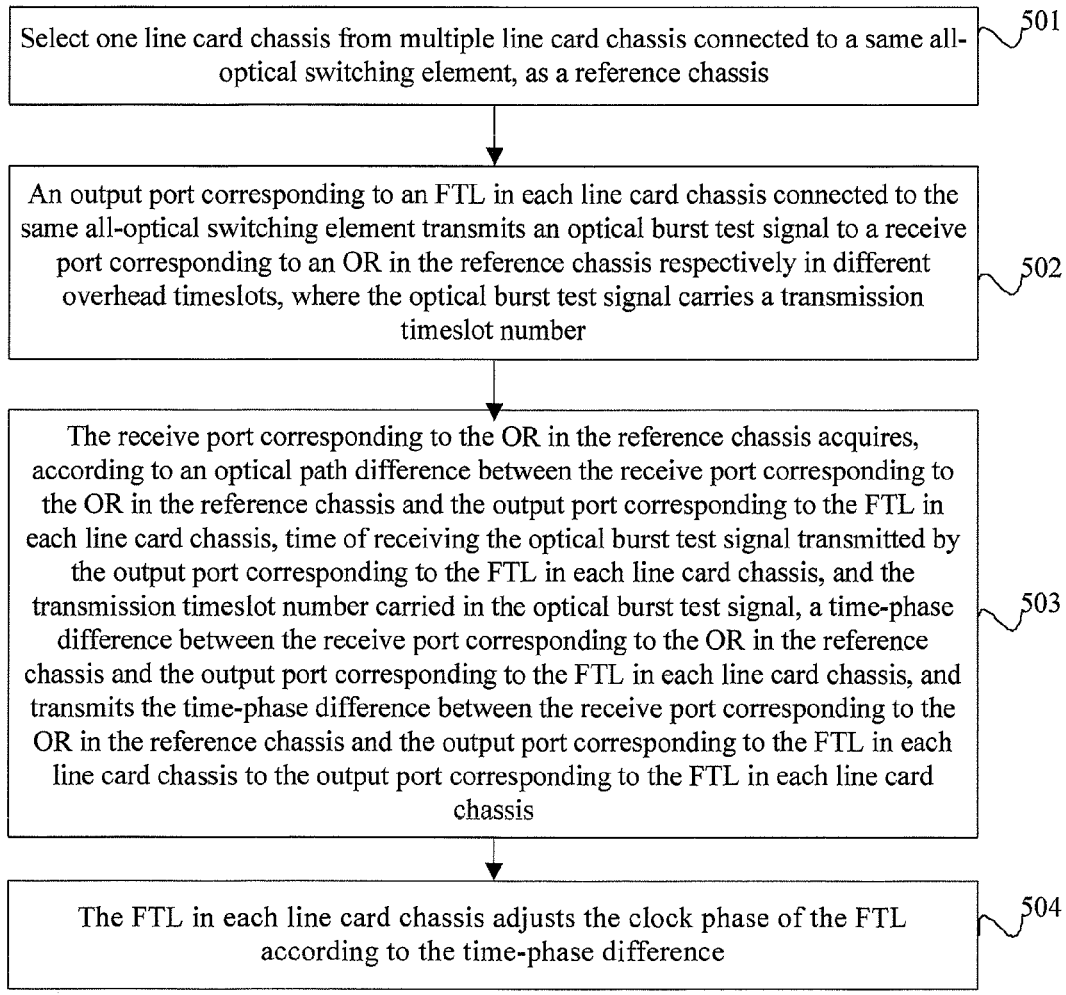
FIG. 5 is a flowchart of an optical burst synchronization method according to another embodiment of the present invention.

FIG. 5 is a flowchart of an optical burst synchronization method according to another embodiment of the present invention. As shown in FIG. 5, the method of this embodiment includes:

Step 501: Select one line card chassis from multiple line card chassis connected to a same all-optical switching element, as a reference chassis.

This embodiment also uses the example in which an all-optical switching element is an AWGR.

This step is similar to step 401, and is not described herein again.

Step 502: An output port corresponding to an FTL in each line card chassis connected to the same all-optical switching element transmits an optical burst test signal to a receive port corresponding to an OR in the reference chassis respectively in different overhead timeslots, where the optical burst test signal carries a transmission timeslot number.

In this embodiment, output ports corresponding to FTLs in all line card chassis connected to the same AWGR respectively transmit optical burst test signals to the receive port corresponding to the OR in the reference chassis. The receive port corresponding to the OR in the reference chassis detects a difference between the actual arrival time, of the optical burst test signal that is transmitted by the corresponding port in each line card chassis by using the FTL and carries the timeslot number, of the local clock referenced by the receive port corresponding to the OR in the reference chassis, and the expected arrival time, and acquires a phase difference of the transmit port of each line card chassis relative to an expectation of the reference chassis.

Step 503: The receive port corresponding to the OR in the reference chassis acquires, according to an optical path difference between the receive port corresponding to the OR in the reference chassis and the output port corresponding to the FTL in each line card chassis, time of receiving the optical burst test signal transmitted by the output port corresponding to the FTL in each line card chassis, and the transmission timeslot number carried in the optical burst test signal, a time-phase difference between the receive port corresponding to the OR in the reference chassis and the output port corresponding to the FTL in each line card chassis, and transmits the time-phase difference between the receive port corresponding to the OR in the reference chassis and the output port corresponding to the FTL in each line card chassis to the output port corresponding to the FTL in each line card chassis.

Specifically, the actual phase difference of the transmit port of each line card chassis relative to an expectation of the reference chassis is: the receive port corresponding to the OR in the reference chassis acquires, according to actual arrival time of a received optical burst test signal that is transmitted by a corresponding port in each line card chassis by using an FTL and carries a transmission timeslot number (time of transmitting the optical burst test signal by the corresponding transmit port by using the FTL by referencing the local clock time of the transmit port), a phase difference between actual arrival time of the optical burst test signal, which is transmitted by the output port corresponding to the FTL in each line card chassis by using the FTL by referencing the local clock time of the output port and received by the OR and the receive port corresponding to the OR in the reference line card chassis by referencing local time of the receive port, and designed and expected arrival time, and transmits the time-phase difference between the clock time of the receive port corresponding to the OR in the reference chassis and the clock time referenced by the output port corresponding to the FTL in each line card chassis to the port corresponding to the FTL in each line card chassis.

When a time-phase difference exists between the FTL in a line card chassis and the OR in the reference chassis, the OR in the reference chassis transmits the time-phase difference to the FTL in the line card chassis.

Step 504: The FTL in each line card chassis adjusts the clock phase of the FTL according to the time-phase difference.

The FTL that receives the time-phase difference adjusts the clock phase of the FTL according to the time-phase difference. If the time-phase difference indicates that the clock phase of the FTL is earlier, a count value corresponding to the time-phase difference is subtracted from the clock pulse counter of the output port corresponding to the FTL. If the time-phase difference indicates that the clock phase of the FTL is lagging, a count value corresponding to the time-phase difference is added to the clock time counter of the output port corresponding to the FTL to implement phase alignment.

In the optical burst synchronization method of this embodiment, a reference chassis is selected from multiple line card chassis connected to a same AWGR, and an FTL in each line card chassis transmits an optical burst test signal to the reference chassis; a receive port corresponding to an OR in the reference chassis acquires, according to a transmission timeslot of the optical burst test signal and a difference between actual arrival time and expected arrival time on the port corresponding to the OR in the reference chassis, a time-phase difference between clock time referenced for transmitting data by the port corresponding to the FTL in each line card chassis and expected clock time of the reference chassis for alignment, and feeds back the time-phase difference to each line card chassis; each line card chassis adjusts the time phase according to the time-phase difference. Therefore, phase alignment can be implemented between line card chassis in an optical network switching node of a multi-chassis cluster, optical burst signals transmitted by all line card chassis can arrive at the AWGR at the same time, and system synchronization is implemented, thereby resolving the collision problem caused by a synchronization.

Especially, when the oscillation frequencies of the local clocks of the line card chassis are different, the phase difference caused by drift of the oscillation frequencies of the local clocks needs to be further suppressed. With respect to this problem, the optical burst synchronization method of this embodiment further includes a step of suppressing the phase difference caused by the drift of the oscillation frequencies of the clocks. Specifically, the output port corresponding to the FTL in each line card chassis connected to the same AWGR transmits burst overhead signals repeatedly in an overhead timeslot corresponding to the chassis number of each line card chassis in a preset multi-frame period by referencing local clock time. The port corresponding to the OR in the reference chassis acquires a difference between actual arrival time of burst signals, which are transmitted by the same line card chassis at two or multiple consecutive times, on the port corresponding to the OR in the reference line card chassis, and arrival time expected by the reference chassis. If the difference does not change, no difference exists between the frequency of the crystal oscillator of the line card chassis and the frequency of the crystal oscillator of the reference chassis, and no drift exists. If a change exists, as the time goes on, the difference becomes increasingly large, which is called relative drift in the phase caused by the frequency difference between the crystal oscillators. An obvious frequency difference may be compensated by pulse deletion/insertion. For a slight difference that can hardly be compensated by pulse deletion/insertion, it is ensured that a recognizable phase difference caused by the drift of the oscillation frequencies of the local clocks is calibrated and compensated according to a preset phase detection period at regular intervals.

Specifically, the reference line card chassis uses a reference clock counter of the port corresponding to the OR in the reference chassis and counting clock pulses based on a higher frequency, as a reference. If the differences between actual arrival time of different burst signals of the same line card chassis and expected arrival time are consistent, the oscillation frequency in the line card chassis where the FTL is located is consistent with the oscillation frequency of the local clock of the reference line card chassis, no frequency drift occurs, and no additional phase difference is generated. If the clock phase differences between arrival time of two or multiple consecutive burst signals and expected arrival time are different, a difference exists in the oscillation frequencies of the local clocks, and phase drift occurs. In this case, according to the variance of the difference between actual arrival time of two burst signals and expected arrival time, the counter that counts the local clock referenced by the output port corresponding to the FTL to generate local time needs to be updated and pulse deletion or pulse insertion processing needs to be performed to implement phase adjustment. Accuracy of phase synchronization may be further improved in this manner.

The optical burst synchronization method provided by the present invention is described from principles in the embodiment shown in FIG. 4 or FIG. 5. The optical burst synchronization method provided by the present invention is further described in detail in the following embodiment with reference to an actual application scenario.

This embodiment is described by using a structure of 4 line card chassis connected to one AWGR shown in FIG. 3 as an example.

In an actual application, an S1 and a corresponding S3 are deployed in the same line card chassis. As shown in FIG. 3, line card chassis 1, 2, 3, and 4 include one S1 and one OR each, and each S1 is connected to one FTL, and each S3 is connected to one OR. That is, one FTL corresponds to one OR, and the FTL and OR are deployed in the same line card chassis. Each line card chassis includes a local crystal oscillator having certain frequency precision, and the local crystal oscillator generates clock pulses of a given nominal frequency. For example, the nominal frequency may be 38.88 megahertz (MHz) or 155.52 MHz or 311.04 MHz and so on. In addition, each line card chassis further includes at least one clock synchronization module, configured to count clock pulses of the nominal frequency, and generate various time periods and boundaries required by each line card chassis, for example, transmit-side local reference clock time and receive-side local reference clock time.

For example, assuming that the nominal frequency is 38.88 MHz, that is, 38,880,000 clock pulses are generated within one second, if one second corresponds to 64,800 timeslots, one timeslot includes 600 consecutive clock pulses. One timeslot cannot be completely used to transmit optical burst signals. A certain gap needs to be reserved between two consecutive optical burst signals, so that hardware such as the FTL and OR can get ready for transmitting and receiving a subsequent optical burst signal. In each embodiment of the present invention, the reserved gap is called a burst gap (BurstGap). For example, in a timeslot including 600 clock pulses, the first 100 clock pulses and last 100 clock pulses may be used as a burst gap, and the middle 400 clock pulses are used to transmit optical burst signals. After each timeslot ends, a timeslot number (ID) of the timeslot in a multi-frame may be counted by performing a carry operation.

In this embodiment, in addition to providing a working reference clock for the S1 and FTL, the clock synchronization module in each line card chassis further provides a clock-based count value output to indicate a transmission boundary (start/end) of an optical burst signal and a timeslot boundary (start/end), and further provides conditions for the S3 and OR to record arrival time of the optical burst signal.

To enable optical burst signals transmitted by each line card chassis to arrive at the AWGR at the same time, that is, to implement optical burst synchronization, a line card chassis 1 is selected as a reference chassis in this embodiment.

A specific method for implementing optical burst synchronization includes the following:

An FTL1_1 in a line card chassis 1 transmits an optical burst test signal to an OR1_1, OR2_1, OR3_1, and OR4_1 in line card chassis 1, 2, 3, and 4 respectively. Specifically, in this embodiment, it is defined that 4 overhead frames form an overhead multi-frame and that each overhead frame includes 81 timeslots. One timeslot in each overhead frame is used to transmit an optical burst test signal and is called an overhead timeslot, and the position of the overhead timeslot in each overhead frame is fixed; and each timeslot includes 600 clock pulses. The overhead timeslot of a zero$^{th}$ frame in the overhead multi-frame is allocated to the reference chassis for self transmission and self reception; the overhead timeslot of a first frame in the overhead multi-frame is used for bidirectional communication (including transmission and reception)

between the line card chassis 1 and the line card chassis 2; the overhead timeslot of a second frame in the overhead multi-frame is used for bidirectional communication between the line card chassis 1 and the line card chassis 3; and the overhead timeslot of a third frame in the overhead multi-frame is used for bidirectional communication between the line card chassis 1 and the line card chassis 4.

It should be noted herein that the number of overhead frames included in an overhead multi-frame is greater than or equal to the number of line card chassis connected to each AWGR. For example, when 200 line card chassis are simultaneously connected to one AWGR, it should be defined that at least 200 overhead frames form an overhead multi-frame. The method for allocating each overhead frame is the same as above.

In overhead timeslots of overhead frames allocated to the line card chassis 1, 2, 3, and 4 for use, the line card chassis 1 transmits an optical burst test signal to the OR1_1, OR2_1, OR3_1, and OR4_1 in the line card chassis 1, 2, 3, and 4 respectively, where the optical burst test signal carries the number of the transmission timeslot of the optical burst test signal. In this embodiment, in any one overhead timeslot, only the OR in one line card chassis (including the reference chassis itself) performs bidirectional communication with the line card chassis 1. For the line card chassis 1, the time interval between two consecutive optical burst test signals is 81×4−1=323. Therefore, the line card chassis 1 has a strong frequency difference absorption capability, and overlap and collision between overhead bursts do not easily occur.

The line card chassis 1, 2, 3, and 4 periodically receive optical burst test signals transmitted in overhead timeslots of different overhead frames from the line card chassis 1 (serving as the reference line card chassis). The OR1_1, OR2_1, OR3_1, and OR4_1 in the line card chassis 1, 2, 3, and 4 respectively record local system time of receiving the optical burst test signal, where the local system time is generated by the clock synchronization module in the line card chassis 1, 2, 3, and 4 by counting clock pulses generated by the local crystal oscillator and provided for the OR1_1, OR2_1, OR3_1, and OR4_1 for use, and the recorded local system time is arrival time of the optical burst test signal. A fixed time difference (namely, an optical path difference) exists between the local system time of the OR1_1, OR2_1, OR3_1, and OR4_1 in the line card chassis 1, 2, 3, and 4 and the local system time of the FTL1_1 in the line card chassis 1. Therefore, the OR1_1, OR2_1, OR3_1, and OR4_1 in the line card chassis 1, 2, 3, and 4 calibrate, according to the recorded arrival time of the optical burst test signal and the timeslot number carried in the reference optical burst test signal from the line card chassis 1, local system clock time referenced by the ORs respectively. Furthermore, a fixed time difference also exists between the FTL-side local system time and the OR-side local system time in each line card chassis. Therefore, in addition to calibrating respective local system time, the OR1_1, OR2_1, OR3_1, and OR4_1 in the line card chassis 1, 2, 3, and 4 may further calibrate local system time on the FTL2_1, FTL3_1, and FTL4_1 sides in the same line card chassis. In an actual application, the OR-side local system time in the same line card chassis may be a delayed output of the local system time of the FTL, that is, the OR needs to add a corresponding delay to the time difference for calibrating the local system time of the OR, so as to calibrate the local system time of the FTL in the same line card chassis. The delay refers to an optical path difference between the OR and the FTL in the same line card chassis.

In the foregoing technical solution, the optical path differences between the OR1_1, OR2_1, OR3_1, and OR4_1 in the line card chassis 1, 2, 3, and 4 and the FTL1_1 in the line card chassis 1 are known in advance. The optical path differences between the OR1_1, OR2_1, OR3_1, and OR4_1, and the FTL1_1, FTL2_1, FTL3_11, and FTL4_1 respectively in the line card chassis 1, 2, 3, and 4 are also known in advance.

This embodiment implements synchronization by defining an overhead multiframe and introducing a periodic overhead timeslot. Optical burst test signals are transmitted in the overhead timeslot to implement bidirectional communication between any line card chassis, and synchronization control may be completed by hardware directly, without requiring participation of software or a network management system, thereby resolving the problem of restriction by the software processing speed.

In the foregoing technical solution, to improve calibration precision of the local system time of each OR and FTL, in this embodiment, an overhead timeslot in each overhead multiframe may be defined as a loopback timeslot. The reference chassis transmits an overhead burst in this timeslot to the first chassis (the reference chassis itself), and each line card chassis also transmits a loopback overhead burst to the line card chassis itself. The loopback timeslot is used for the FTL in each line card chassis to transmit an optical burst loopback signal to the OR in the line card chassis, so that the optical path difference between the FTL and the OR in the same line card chassis is tested in real time. More preferably, the loopback timeslot is a first overhead timeslot.

Using the structure shown in FIG. 3 as an example, the FTL1_1, FTL2_1, FTL3_1, and FTL4_1 in the line card chassis 1, 2, 3, and 4 transmit, in their respective loopback timeslot, an optical burst loopback signal to the OR1_1, OR2_1, OR3_1, and OR4_1 respectively, where the optical burst loopback signal carries the number of the transmission timeslot of the optical burst loopback signal. The OR1_1, OR2_1, OR3_1, and OR4_1 in the line card chassis 1, 2, 3, and 4 record arrival time of the optical burst loopback signal, and calculate the time difference between the arrival time and the time corresponding to the timeslot number carried in the optical burst loopback signal to acquire the optical path difference between the OR1_1, OR2_1, OR3_1, and OR4_1, thereby laying a basis for the OR1_1, OR2_1, OR3_1, and OR4_1 to calibrate the local system time of the FTL1_1, FTL2_1, FTL3_1, and FTL4_1 respectively.

Generally, a line card chassis includes multiple FTLs and multiple ORs, and each FTL and the corresponding OR are connected to different AWGRs. Each AWGR corresponds to one plane, and planes are unrelated to each other. In other words, synchronization needs to be implemented between the FTL and the OR connected to the same AWGR, and synchronization of the FTL and the OR connected to the same AWGR is unrelated to FTLs and ORs connected to other AWGRs. In this embodiment, a receive port corresponding to an OR in each line card chassis is selected to implement synchronization. The receive port corresponding to the OR may receive multiple optical burst signals. Therefore, the receive port corresponding to the OR may first filter all received optical burst signals, and extract an optical burst loopback signal and an optical burst test signal from the signals. In this embodiment, the receive port corresponding to the OR performs time calibration for the time phase referenced for receiving burst data. In addition, the arrival time of the two signals and the timeslot numbers carried in the two signals may be transmitted to the clock synchronization module, and time calibration is performed by the clock synchronization module.

Further, on the basis of the foregoing technical solution, in some scenarios, natural frequencies of local crystal oscillators of all line card chassis are inconsistent (a difference exists), and may drift with a temperature change and so on. The difference and drift cause the actual length of a clock unit generated based on an occurrence frequency count thereof to vary in each line card chassis. This embodiment provides a method for suppressing the change and drift of the actual length and phase of the clock unit caused by the difference and drift of the natural frequencies of the local crystal oscillators. The receive port corresponding to the OR in each line card chassis may use clock pulses of a higher frequency to count frequency pulses of a local crystal oscillator of a higher frequency between two or multiple optical burst test signals and record the count result, and acquire at least two count results, and then determine, by determining whether the at least two count results are the same, whether drift of the crystal oscillator occurs, and perform time calibration according to the difference between the count results. A count operation performed between two optical burst test signals may be performed once at regular intervals, that is, the count operation is performed periodically according to a preset phase detection period, and the count results acquired in two phase detection periods are compared to determine whether phase adjustment is required, so that the overhead and burden of the whole system may be reduced. Still using the line card chassis 2 in FIG. 3 as an example, assuming that the OR2_1 in the line card chassis 2 counts the local crystal oscillator between two optical burst test signals at regular intervals (for example, 1 second), after two count results are acquired, the two count results are compared. For example, if 9,720,000 clock pulses are counted in the first count result, and 9,720,000+9.72 clock pulses are counted in the second count result, the two count results are different, which indicates that the clock pulse frequency of the local crystal oscillator in the line card chassis 2 has drifted and is faster than before by 1 ppm. Therefore, this frequency difference needs to be compensated, and calibration processing needs to be performed for the pulse count of the local clock synchronization module by pulse deletion/insertion.

Figure 6:
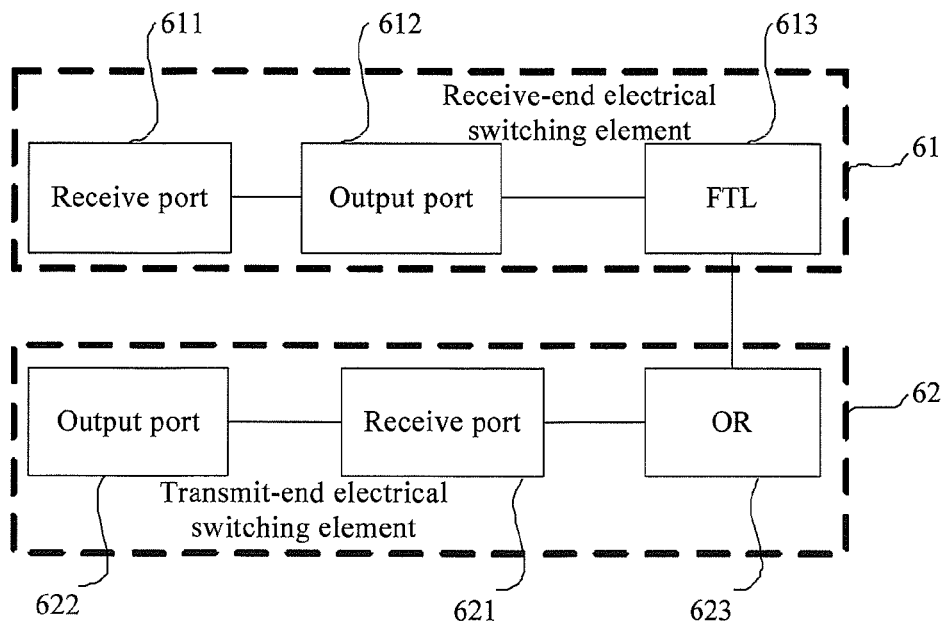
FIG. 6 is a schematic structural diagram of a line card chassis used to implement an optical burst synchronization method provided by an embodiment of the present invention according to an embodiment of the present invention.

FIG. 6 is a schematic structural diagram of a line card chassis used to implement an optical burst synchronization method provided by an embodiment of the present invention according to an embodiment of the present invention. As shown in FIG. 6, the line card chassis of this embodiment includes a receive-end electrical switching element 61 and a transmit-end electrical switching element 62. The receive-end electrical switching element 61 includes multiple receive ports 611, multiple output ports 612, and an FTL 613 connected to each output port 612. The transmit-end electrical switching element 62 includes multiple receive ports 621, multiple output ports 622, and an OR 623 connected to each receive port 621. The output port to which the FTL is connected is also called the output port corresponding to the FTL. The receive port to which the OR is connected is also called the receive port corresponding to the OR. One line card chassis usually includes several FTL 613 and OR 623 port pairs. The output port 612 corresponding to each FTL 613 is configured to transmit, when the line card chassis is selected as a reference chassis, an optical burst test signal to a receive port corresponding to an OR in other line card chassis that are connected to a same all-optical switching element as the reference line card chassis, so that the receive port corresponding to the OR in the other line card chassis acquires, according to an optical path difference between the receive port corresponding to the OR in the other line card chassis and the output port 612 corresponding to the FTL 613 that transmits the reference test signal in the reference chassis, actual time of receiving the optical burst test signal on the receive port corresponding to the OR in the other line card chassis, and a transmission timeslot number carried in the optical burst test signal, a phase difference between the arrival phase of the reference burst test signal from the reference chassis on the receive port corresponding to the OR in the other line card chassis and the local time referenced for receiving on the receive port corresponding to the OR in the other line card chassis (called a time-phase difference between the receive port corresponding to the OR in the other line card chassis and the output port corresponding to the FTL in the reference chassis) in comparison with the local reference clock referenced for receiving data by the receive port corresponding to the OR in the other line card chassis, and adjusts, according to the acquired time-phase difference, a clock phase referenced for receiving burst data on the receive port corresponding to the OR in the other line card chassis and a clock phase referenced for transmitting burst data on an output port corresponding to an FTL located in the same line card chassis and corresponding to the OR in the same line card chassis.

The receive port 621 corresponding to each OR 623 is configured to receive, when one line card chassis among the other line card chassis that are connected to the same all-optical switching element as the line card chassis is selected as a reference chassis, an optical burst test signal transmitted by an output port corresponding to an FTL in the reference chassis by using the FTL, acquire, according to an optical path difference between the receive port 621 corresponding to the OR 623 and the output port corresponding to the FTL that transmits the optical burst test signal in the reference chassis, actual time of receiving the optical burst test signal, and a transmission timeslot number carried in the optical burst test signal, a phase difference between the arrival phase of the reference burst test signal from the reference chassis on the receive port 621 corresponding to the OR 623 and the local time referenced for receiving on the receive port 621 corresponding to the OR 623 (called a time-phase difference between the receive port 621 corresponding to the OR 623 and the output port corresponding to the FTL that transmits the optical burst test signal in the reference chassis) in comparison with the local reference clock referenced for receiving burst data on the receive port 621 corresponding to the OR 623, and adjust, according to the time-phase difference, the clock phase referenced for receiving burst data on the receive port 621 corresponding to the OR 623 and the clock phase referenced for transmitting burst data on the output port 612 corresponding to the FTL 613 located in the same line card chassis and corresponding to the OR 623.

The receive port 621 corresponding to the OR 623 in the line card chassis of this embodiment specifically adjusts, according to the time-phase difference and the optical path difference between the output port corresponding to the OR 623 and the output port 612 corresponding to the FTL 613 located in the same line card chassis and corresponding to the OR 623, the clock phase referenced for transmitting burst data on the output port 612 corresponding to the FTL 613 located in the same line card chassis and corresponding to the OR 623 (also called the clock phase referenced for transmitting burst data).

The node device of this embodiment may be configured to execute the process of the optical burst synchronization method shown in FIG. 4. The detailed working principles thereof are described in the method embodiment and not described herein again.

Further, the output port 612 corresponding to the FTL 613 in the line card chassis of this embodiment further transmits, by using the FTL 613 connected to the output port 612, an optical burst loopback signal to the OR 623 located in the same line card chassis and corresponding to the FTL 613, where the optical burst loopback signal carries a transmission timeslot number.

Correspondingly, the receive port 621 corresponding to the OR 623 in the line card chassis of this embodiment receives the optical burst loopback signal, and acquires, according to time of receiving the optical burst loopback signal and the transmission timeslot number carried in the optical burst loopback signal, an optical path difference between the receive port 621 corresponding to the OR 623 and the output port 612 corresponding to the FTL 613 located in the same line card chassis and corresponding to the OR 623. The receive port 621 corresponding to the OR 623 adjusts, according to the acquired time-phase difference and the optical path difference between the output port 612 corresponding to the FTL 613 and the receive port 621 corresponding to the OR 623, the clock phase referenced for transmitting data on the output port 612 corresponding to the FTL 613.

Still further, the receive port 621 corresponding to the OR 623 in the line card chassis provided by this embodiment further adjusts, according to a preset phase detection period and a difference between a count result of the local clock between two or multiple consecutively received optical burst test signals and a designed and expected value, the clock phase referenced for receiving burst data by the receive port 621 corresponding to the OR 623 (or adjusts the clock phase referenced for receiving burst data on the receive port 621 corresponding to the OR 623, or adjusts the number of pulses counted in a time unit by the clock phase indication counter of the receive port 621 corresponding to the OR 623), and adjusts the number of pulses counted in a time unit by the clock phase indication counter of the output port 612 corresponding to the FTL 613 located in the same line card chassis and corresponding to the OR 623 (or adjusts the clock phase referenced for transmitting burst data on the output port 612 corresponding to the FTL 613), thereby calibrating the length of the unit time inconsistent in each line card chassis.

The all-optical switching element may be implemented by an AWGR, but is not limited thereto.

In an actual application, the control and management functions in the foregoing optical burst synchronization process may be implemented by a central processing unit (Central Processing Unit, CPU for short) and a software subsystem in the line card chassis. For example, reception and transmission of optical burst test signals may be completed by the CPU and the software subsystem, while acquisition of the time-phase difference and adjustment of the clock phase may be completed by the clock synchronization module.

The line card chassis of this embodiment, when not selected as a reference chassis, receives an optical burst test signal transmitted by the output port corresponding to the FTL in the reference chassis, and the receive port corresponding to the OR in the line card chassis acquires, according to the transmission timeslot of the optical burst test signal, arrival time of the optical burst test signal, and the optical path difference between the receive port corresponding to the OR in the line card chassis and the output port corresponding to the FTL in the line card chassis, a time-phase difference between the line card chassis of this embodiment and the reference chassis, and then the OR in the line card chassis adjusts, according to the time-phase difference, the time phase referenced for receiving burst data by the receive port corresponding to the OR and the time phase referenced for transmitting burst data by the output port corresponding to the FTL. Therefore, phase alignment can be implemented between line card chassis in an optical network switching node of a multi-chassis cluster, optical burst signals transmitted by all line card chassis and carrying the same timeslot number can arrive at the AWGR at the same time, and system synchronization is implemented, thereby resolving the collision problem caused by synchronization.

Figure 7:
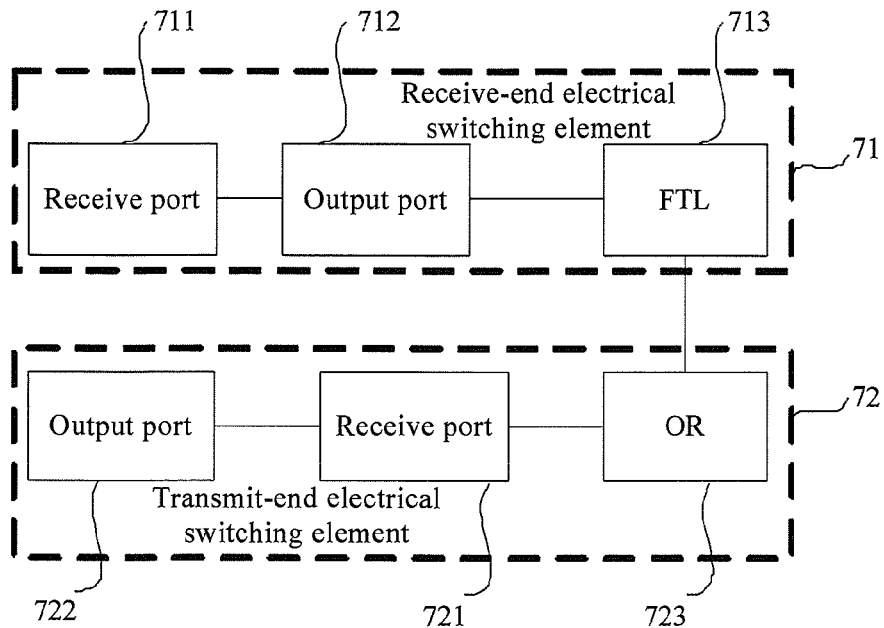
FIG. 7 is a schematic structural diagram of a line card chassis used to implement an optical burst synchronization method provided by an embodiment of the present invention according to another embodiment of the present invention.

FIG. 7 is a schematic structural diagram of a line card chassis used to implement an optical burst synchronization method provided by an embodiment of the present invention according to another embodiment of the present invention. As shown in FIG. 7, the line card chassis of this embodiment includes a receive-end electrical switching element 71 and a transmit-end electrical switching element 72. The receive-end electrical switching element 71 includes multiple receive ports 711, multiple output ports 712, and an FTL 713 connected to each output port 712. The transmit-end electrical switching element 72 includes multiple receive ports 721, multiple output ports 722, and an OR 723 connected to each receive port 721. The output port to which each FTL is connected is also called the output port corresponding to the FTL. The receive port to which each OR is connected is also called the receive port corresponding to the OR.

The output port corresponding to each FTL 713 is configured to transmit an optical burst test signal to an OR in a line card chassis that is connected to a same all-optical switching element as the line card chassis of this embodiment and selected as a reference chassis, receive a time-phase difference transmitted by the receive port corresponding to the OR in the reference chassis, between the output port corresponding to the FTL 713 in the line card chassis and the receive port corresponding to the OR in the reference chassis, and adjust, according to the time-phase difference, the clock phase referenced for transmitting electrical burst data on the output port corresponding to the FTL. The receive port corresponding to the OR in the reference chassis detects a difference between arrival time of an optical burst test signal, which is transmitted by the output port corresponding to the FTL 713 in the line card chassis of this embodiment by using the FTL 713 connected to the output port and carries a timeslot number, on the receive port corresponding to the OR in the reference chassis, and the arrival time phase of the optical burst test signal expected by the receive port corresponding to the OR in the reference chassis, and uses the difference as a time-phase difference. Specifically, the receive port corresponding to the OR in the reference chassis acquires the time-phase difference according to the actual arrival time of the received optical burst test signal transmitted by the output port corresponding to the FTL 713 in the line card chassis of this embodiment, on the receive port corresponding to the OR in the reference chassis, the optical path difference between the receive port corresponding to the OR in the reference chassis and the output port corresponding to the FTL 713 in the line card chassis of this embodiment, the transmission timeslot number carried in the optical burst test signal, and the difference of the arrival time phase, expected by the receive port corresponding to the OR in the reference chassis, of the optical burst test signal carrying the same timeslot number from other line card chassis.

The receive port 721 corresponding to each OR 723 is configured to receive, when the line card chassis is selected as a reference chassis, an optical burst test signal transmitted by an output port corresponding to an FTL in other line card chassis that are connected to the same all-optical switching element as the reference line card chassis, acquire, according to an optical path difference between the receive port 721 corresponding to each OR 723 and the output port corresponding to the FTL in the other line card chassis, time of receiving the optical burst test signal transmitted by the output port corresponding to the FTL in the line card chassis, a transmission timeslot number carried in the optical burst test signal, and a comparison result of expected arrival time of the optical burst test signal carrying the specific timeslot number, on the receive port corresponding to the OR in the reference chassis, a time-phase difference between the receive port 721 corresponding to each OR 723 and the output port corresponding to the FTL in the other line card chassis (that is, acquire the difference between the time phase referenced for transmitting burst data by the output corresponding to the FTL in the other line card chassis and the expected time phase), and transmit the time-phase difference to the output port corresponding to the FTL in the other line card chassis, so that the output port corresponding to the FTL in the other line card chassis adjusts, according to the time-phase difference, a clock phase referenced for transmitting electrical burst data on the output port corresponding to the FTL in the other line card chassis, so that the time phase referenced for transmitting data on the output port corresponding to the FTL in the other line card chassis complies with the design and expectation.

The line card chassis of this embodiment may be configured to execute the process of the optical burst synchronization method shown in FIG. 5. The detailed working principles thereof are described in the method embodiment and not described herein again.

Still further, the output port 712 corresponding to the FTL 713 in the line card chassis provided by this embodiment further counts, according to a preset phase detection period, a local clock between two or multiple consecutively received time-phase differences returned by the receive port corresponding to the OR in the reference chassis, and records a count result, and adjusts, according to two consecutive count results, the clock phase referenced for transmitting electrical burst data on the output port corresponding to the FTL.

Because the clock phase of the OR 723 located in the same line card chassis as the FTL 713 is a delayed clock phase of the FTL 713, adjusting the clock phase of the FTL 713 is equivalent to adjusting the clock phase of the OR 723.

The all-optical switching element may be implemented by an AWGR, but is not limited thereto.

When the line card chassis of this embodiment is not selected as a reference chassis, the FTL in the line card chassis transmits an optical burst test signal to the reference chassis, and the receive port corresponding to the OR in the reference chassis acquires the time-phase difference between the line card chassis of this embodiment and the reference chassis according to the transmission timeslot of the optical burst test signal, arrival time of the optical burst test signal, and the optical path difference between the receive port corresponding to the OR in the reference chassis and the output port corresponding to the FTL in the line card chassis, and feeds back the time-phase difference to the line card chassis of this embodiment, and then the FTL in the line card chassis of this embodiment adjusts the time phase according to the time-phase difference. Therefore, phase alignment can be implemented between line card chassis in an optical network switching node of a multi-chassis cluster, optical burst signals transmitted by all line card chassis and carrying the same timeslot number can arrive at the AWGR at the same time, and system synchronization is implemented, thereby resolving the collision problem caused by synchronization.

An embodiment of the present invention provides an optical network switching node in a multi-chassis cluster, including a line card chassis and a all-optical switching element.

The line card chassis of this embodiment is the line card chassis shown in FIG. 6. The implementation of the embodiment shown in FIG. 4 may be referenced for the working principles thereof. The specific structure thereof is shown in FIG. 6 and not described herein again.

In this embodiment, the all-optical switching element includes multiple input ends and multiple output ends; each output port of each receive-end electrical switching element is connected, by using an FTL connected to the output port, to an input end of the all-optical switching element, and each receive port of each transmit-end electrical switching element is connected, by using an OR connected to the receive port, to an output port of the all-optical switching element.

Each receive-end electrical switching element is configured to receive multiple data units through multiple receive ports of the receive-end electrical switching element, perform stage-1 electrical switching for the received multiple data units, and after electrical/optical conversion is performed by FTLs connected to multiple output ports of the receive-end electrical switching element, output the multiple data units to the all-optical switching element.

The all-optical switching element is configured to perform all-optical space division switching for the multiple data units output by the receive-end electrical switching element, and output the multiple data units to the transmit-end electrical switching element.

The transmit-end electrical switching element is configured to perform optical/electrical conversion, by using ORs connected to multiple receive ports of the transmit-end electrical switching element, for the multiple data units output by the all-optical switching element, and then perform stage-2 electrical switching for the multiple data units after the optical/electrical conversion, and output the multiple data units through multiple output ports of the transmit-end electrical switching element.

The all-optical switching element may be implemented by an AWGR.

The specific structure, connection relationship, and functions of related modules of the optical network switching node in the multi-chassis cluster provided by this embodiment are shown in FIG. 1 and FIG. 2 and not described herein again.

The optical network switching node in the multi-chassis cluster of this embodiment, based on the line card chassis provided by the foregoing embodiment, resolves the optical burst synchronization problem, implements a switching manner of electrical switching-all optical switching-electrical switching, implements an OTN-based multi-chassis cluster system, increases the capacity of the multi-chassis cluster system, and reduces power consumption.

Another embodiment of the present invention provides an optical network switching node in a multi-chassis cluster, including a line card chassis and an all-optical switching element.

The line card chassis of this embodiment is the line card chassis shown in FIG. 7. The working principles thereof are described in the embodiment shown in FIG. 5. The specific structure thereof is shown in FIG. 7 and not described herein again.

In this embodiment, the all-optical switching element includes multiple input ends and multiple output ends; each output port of each receive-end electrical switching element is connected, by using an FTL connected to the output port, to an input end of the all-optical switching element, and each receive port of each transmit-end electrical switching element is connected, by using an OR connected to the receive port, to an output port of the all-optical switching element.

Each receive-end electrical switching element is configured to receive multiple data units through multiple receive ports of the receive-end electrical switching element, perform stage-1 electrical switching for the received multiple data units, and after electrical/optical conversion is performed by FTLs connected to multiple output ports of the receive-end electrical switching element, output the multiple data units to the all-optical switching element.

The all-optical switching element is configured to perform all-optical space division switching for the multiple data units output by the receive-end electrical switching element, and output the multiple data units to the transmit-end electrical switching element.

The transmit-end electrical switching element is configured to perform optical/electrical conversion, by using ORs connected to multiple receive ports of the transmit-end electrical switching element, for the multiple data units output by the all-optical switching element, and then perform stage-2 electrical switching for the multiple data units after the optical/electrical conversion, and output the multiple data units through multiple output ports of the transmit-end electrical switching element.

The all-optical switching element may be implemented by an AWGR.

The specific structure, connection relationship, and functions of related modules of the optical network switching node in the multi-chassis cluster provided by this embodiment are shown in FIG. 1 and FIG. 2 and not described herein again.

The optical network switching node in the multi-chassis cluster of this embodiment, based on the line card chassis provided by the foregoing embodiment, resolves the optical burst synchronization problem, implements a switching manner of electrical switching-all optical switching-electrical switching, implements an OTN-based multi-chassis cluster system, increases the capacity of the multi-chassis cluster system, and reduces power consumption.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An optical burst synchronization method, comprising:
   selecting one line card chassis from multiple line card chassis connected to a same all-optical switching element, as a reference chassis, and transmitting, by an output port corresponding to a wavelength Fast tunable optical laser (FTL) in the reference chassis, an optical burst test signal by using the FTL respectively to receive ports corresponding to optical receivers (ORs) in the multiple line card chassis connected to the same all-optical switching element, wherein the optical burst test signal carries a transmission timeslot number, and
   acquiring, by a receive port corresponding to an optical receiver (OR) in each line card chassis connected to the same all-optical switching element, according to an optical path difference between the receive port corresponding to the OR in each line card chassis and the output port corresponding to the FTL in the reference chassis, time of receiving the optical burst test signal, and the transmission timeslot number carried in the optical burst test signal, a time-phase difference between the receive port corresponding to the OR in each line card chassis and the output port corresponding to the FTL in the reference chassis, and adjusting, according to the time-phase difference, a clock phase referenced for receiving electrical burst data on the receive port corresponding to the OR and a clock phase referenced for transmitting electrical burst data on an output port corresponding to an FTL located in the same line card chassis and corresponding to the OR.

2. The optical burst synchronization method according to claim 1, wherein adjusting, by the receive port corresponding to the OR in each line card chassis connected to the same all-optical switching element, according to the time-phase difference, a clock phase referenced for transmitting electrical burst data on an output port corresponding to an FTL located in the same line card chassis and corresponding to the OR, comprises:
   adjusting, by the receive port corresponding to the OR in each line card chassis connected to the same all-optical switching element, according to the time-phase difference and an optical path difference between the receive port corresponding to the OR and the output port corresponding to the FTL located in the same line card chassis and corresponding to the OR, the clock phase referenced for transmitting electrical burst data on the output port corresponding to the FTL located in the same line card chassis and corresponding to the OR.

3. The optical burst synchronization method according to claim 2, wherein before adjusting, by the receive port corresponding to the OR in each line card chassis connected to the same all-optical switching element, according to the time-phase difference and an optical path difference between the receive port corresponding to the OR and the output port corresponding to the FTL located in the same line card chassis and corresponding to the OR, the clock phase referenced for transmitting electrical burst data on the output port corresponding to the FTL located in the same line card chassis and corresponding to the OR, the method further comprises:
   transmitting, by the output port corresponding to the FTL located in the same line card chassis and corresponding to the OR, an optical burst loopback signal to the receive port corresponding to the OR, wherein the optical burst loopback signal carries a transmission timeslot number, and
   acquiring, by the receive port corresponding to the OR, according to time of receiving the optical burst loopback signal and the transmission timeslot number carried in the optical burst loopback signal, an optical path difference between the receive port corresponding to the OR and the output port corresponding to the FTL located in the same line card chassis and corresponding to the OR.

4. The optical burst synchronization method according to claim 1 further comprising:
   counting, by the receive port corresponding to the OR in each line card chassis connected to the same all-optical switching element, according to a preset phase detection period, clock pulses between two or more than two consecutively received optical burst test signals, and recording a count result, and adjusting, according to two consecutive count results, the clock phase referenced for receiving electrical burst data on the receive port corresponding to the OR and the clock phase referenced for transmitting electrical burst data on the output port corresponding to the FTL located in the same line card chassis and corresponding to the OR.

5. The optical burst synchronization method according to claim 1, wherein the all-optical switching element is an arrayed waveguide grating router (AWGR).

6. An optical burst synchronization method, comprising:
selecting one line card chassis from multiple line card chassis connected to a same all-optical switching element, as a reference chassis;
transmitting, by an output port corresponding to a wavelength-tunable optical transmission laser (FTL) in each line card chassis connected to the same all-optical switching element, an optical burst test signal by using the FTL to a receive port corresponding to an optical receiver (OR) in the reference chassis, wherein the optical burst test signal carries a transmission timeslot number,
acquiring, by the receive port corresponding to the OR in the reference chassis, according to an optical path difference between the receive port corresponding to the OR in the reference chassis and the output port corresponding to the FTL in each line card chassis, time of receiving the optical burst test signal transmitted by the output port corresponding to the FTL in each line card chassis, and the transmission timeslot number carried in the optical burst test signal, a time-phase difference between the receive port corresponding to the OR in the reference chassis and the output port corresponding to the FTL in each line card chassis, and transmitting the time-phase difference between the receive port corresponding to the OR in the reference chassis and the output port corresponding to the FTL in each line card chassis to the output port corresponding to the FTL in each line card chassis; and
adjusting, by the output port corresponding to the FTL in each line card chassis, according to the time-phase difference, a clock phase referenced for transmitting electrical burst data on the output port corresponding to the FTL.

7. The optical burst synchronization method according to claim 6, further comprising:
counting, by the output port corresponding to the FTL in each line card chassis connected to the same all-optical switching element, according to a preset phase detection period, a local clock between two or more than two consecutively received time-phase differences returned by the receive port corresponding to the OR in the reference chassis, and recording a count result, and adjusting, according to two consecutive count results, the clock phase referenced for transmitting electrical burst data on the output port corresponding to the FTL.

8. The optical burst synchronization method according to claim 6, wherein the all-optical switching element is an arrayed waveguide grating router (AWGR).

9. A line card chassis, comprising:
a receive-end electrical switching element and a transmit-end electrical switching element, wherein the receive-end electrical switching element comprises multiple receive ports, multiple output ports, and a wavelength-tunable optical transmission laser (FTL) connected to each output port, and the transmit-end electrical switching element comprises multiple receive ports, multiple output ports, and an optical receiver (OR) connected to each receive port, wherein:

the output port corresponding to each FTL is configured to transmit, when the line card chassis is selected as a reference chassis, an optical burst test signal to a receive port corresponding to an optical receiver OR in other line card chassis that are connected to a same all-optical switching element as the reference line card chassis, so that the receive port corresponding to the OR in the other line card chassis acquires, according to an optical path difference between the receive port corresponding to the OR in the other line card chassis and the output port corresponding to the FTL that transmits the reference burst test signal in the reference chassis, time of receiving the optical burst test signal, and a transmission timeslot number carried in the optical burst test signal, a time-phase difference between the receive port corresponding to the OR in the other line card chassis and the output port corresponding to the FTL in the reference chassis, and adjusts, according to the time-phase difference, a clock phase referenced for receiving electrical burst data on the receive port corresponding to the OR and a clock phase referenced for transmitting electrical burst data on an output port corresponding to an FTL located in the same line card chassis and corresponding to the OR; and the receive port corresponding to each OR is configured to receive, when one line card chassis among the other line card chassis that are connected to the same all-optical switching element as the line card chassis is selected as a reference chassis, an optical burst test signal transmitted by an output port corresponding to an FTL in the reference chassis by using the FTL, acquire, according to an optical path difference between the receive port corresponding to each OR and the output port corresponding to the FTL that transmits the optical burst test signal in the reference chassis, time of receiving the optical burst test signal, and a transmission timeslot number carried in the optical burst test signal, a time-phase difference between the receive port corresponding to each OR and the output port corresponding to the FTL that transmits the optical burst test signal in the reference chassis, and adjust, according to the time-phase difference, a clock phase referenced for receiving electrical burst data on the receive port corresponding to the OR and a clock phase referenced for transmitting electrical burst data on the output port corresponding to the FTL located in the same line card chassis and corresponding to the OR.

10. The line card chassis according to claim 9, wherein the receive port corresponding to the OR adjusts, according to the time-phase difference and an optical path difference between the output port corresponding to the OR and the output port corresponding to the FTL located in the same line card chassis and corresponding to the OR, the clock phase referenced for transmitting electrical burst data on the output port corresponding to the FTL located in the same line card chassis and corresponding to the OR.

11. The line card chassis according to claim 10, wherein:
the output port corresponding to each FTL is further configured to transmit an optical burst loopback signal to a receive port corresponding to an OR located in the same line card chassis and corresponding to the FTL, wherein the optical burst loopback signal carries a transmission timeslot number, and
the receive port corresponding to the OR is further configured to acquire, according to time of receiving the optical burst loopback signal and the timeslot number carried in the optical burst loopback signal, an optical path difference between the receive port corresponding to the OR and the output port corresponding to the FTL located in the same line card chassis and corresponding to the OR.

12. The line card chassis according to claim 9, wherein the receive port corresponding to the OR is further configured to count, according to a preset phase detection period, a local clock between two or more than two consecutively received optical burst test signals, and record a count result, and adjust, according to two consecutive count results, the clock phase referenced for receiving electrical burst data on the receive port corresponding to the OR and the clock phase referenced for transmitting electrical burst data on the output port corresponding to the FTL located in the same line card chassis and corresponding to the OR.

13. An optical network switching node in a multi-chassis cluster, comprising the line card chassis and all-optical switching element according to claim 9, wherein:
the all-optical switching element comprises multiple input ends and multiple output ends; each output port of each receive-end electrical switching element is connected, by using an FTL connected to the output port, to an input end of the all-optical switching element, and each receive port of each transmit-end electrical switching element is connected, by using an OR connected to the receive port, to an output port of the all-optical switching element;
each receive-end electrical switching element is configured to receive multiple data units through multiple receive ports of the receive-end electrical switching element, perform stage-1 electrical switching for the received multiple data units, and after electrical/optical conversion is performed by FTLs connected to multiple output ports of the receive-end electrical switching element, output the multiple data units to the all-optical switching element;
the all-optical switching element is configured to perform all-optical space division switching for the multiple data units output by the receive-end electrical switching element, and output the multiple data units to the transmit-end electrical switching element; and
the transmit-end electrical switching element is configured to perform optical/electrical conversion, by using ORs connected to multiple receive ports of the transmit-end electrical switching element, for the multiple data units output by the all-optical switching element, and then perform stage-2 electrical switching for the multiple data units after the optical/electrical conversion, and output the multiple data units through multiple output ports of the transmit-end electrical switching element.

14. The optical network switching node in the multi-chassis cluster according to claim 13, wherein:
the all-optical switching element is an arrayed waveguide grating router (AWGR);
each FTL is connected to an input end of the AWGR; each OR is connected to an output end of the AWGR; an FTL and a corresponding OR are located in a same line card chassis, and are respectively connected to an input end and an output end of the same AWGR;
output ports with same numbers, in all receive-end electrical switching elements, are respectively connected, by using FTLs connected to the output ports, to different input ends of the same AWGR; and
input ports with same numbers, in all transmit-end electrical switching elements, are respectively connected, by using ORs connected to the input ports, to different output ends of the same AWGR.

15. The optical network switching node in the multi-chassis cluster according to claim 14, wherein:
each FTL is configured to receive an electrical time division burst data unit on an output port of the receive-end electrical switching element connected to the FTL, convert the electrical time division burst data unit into a time division optical burst signal, and transmit the time division optical burst signal to the AWGR;
each AWGR is configured to switch time division optical burst signals from different FTLs in a same timeslot to different output ends to transmit the time division optical burst signals to the OR; and
each OR is configured to receive a time division optical burst signal transmitted by the AWGR on one output end, and convert the time division optical burst signal into an electrical time division burst data unit, and then send the electrical time division burst data unit to an input port of the transmit-end electrical switching element connected to the OR.

16. The optical network switching node in the multi-chassis cluster according to claim 14, wherein each AWGR simultaneously receives time division optical burst signals in a same timeslot, and simultaneously transmits the time division optical burst signals switched to different output ends, to the OR connected to each output end.

17. A line card chassis, comprising:
a receive-end electrical switching element and a transmit-end electrical switching element, wherein the receive-end electrical switching element comprises multiple receive ports, multiple output ports, and a wavelength-tunable optical transmission laser (FTL) connected to each output port, and the transmit-end electrical switching element comprises multiple receive ports, multiple output ports, and an optical receiver (OR) connected to each receive port, wherein:
the output port corresponding to each FTL is configured to transmit an optical burst test signal from the line card chassis to a receive port corresponding to an OR in a line card chassis that is connected to a same all-optical switching element as the line card chassis and selected as a reference chassis, receive a time-phase difference between the output port corresponding to the FTL in the line card chassis and the receive port corresponding to the OR in the reference chassis, from the receive port corresponding to the OR in the reference chassis, and adjust, according to the time-phase difference, a clock phase referenced for transmitting electrical burst data on the output port corresponding to the FTL, wherein the optical burst test signal carries a transmission timeslot number, and the time-phase difference is acquired by the receive port corresponding to the OR in the reference chassis according to an optical path difference between the receive port corresponding to the OR in the reference chassis and the output port corresponding to the FTL that transmits the optical burst test signal in the line card chassis, time of receiving the optical burst test signal transmitted by the output port corresponding to the FTL in the line card chassis, and the transmission timeslot number carried in the optical burst test signal; and
the receive port corresponding to each OR is configured to receive, when the line card chassis is selected as a reference chassis, an optical burst test signal transmitted by an output port corresponding to an FTL in other line card chassis that are connected to the same all-optical switching element as the reference line card chassis, acquire, according to an optical path difference between the receive port corresponding to each OR and the output port corresponding to the FTL in the other line card chassis, time of receiving the optical burst test signal transmitted by the output port corresponding to the FTL in the other line card chassis, and a transmission timeslot number in the optical burst test signal, a time-phase difference between the receive port corresponding to each OR and the output port corresponding to the FTL in the other line card chassis, and transmit the time-phase difference to the output port corresponding to the FTL in the other line card chassis, so that the output port corresponding to the FTL in the other line card chassis adjusts, according to the time-phase difference, a clock phase referenced for transmitting electrical burst data on the output port corresponding to the FTL in the other line card chassis.

18. The line card chassis according to claim 17, wherein the output port corresponding to the FTL in the line card chassis is further configured to count, according to a preset phase detection period, a local clock between two or more than two consecutively received time-phase differences returned by the receive port corresponding to the OR in the reference chassis, and record a count result, and adjust, according to two consecutive count results, the clock phase referenced for transmitting electrical burst data on the output port corresponding to the FTL.

19. An optical network switching node in a multi-chassis cluster, comprising the line card chassis and all-optical switching element according to claim 17, wherein:
the all-optical switching element comprises multiple input ends and multiple output ends; each output port of each receive-end electrical switching element is connected, by using an FTL connected to the output port, to an input end of the all-optical switching element, and each receive port of each transmit-end electrical switching element is connected, by using an OR connected to the receive port, to an output port of the all-optical switching element;
each receive-end electrical switching element is configured to receive multiple data units through multiple receive ports of the receive-end electrical switching element, perform stage-1 electrical switching for the received multiple data units, and after electrical/optical conversion is performed by FTLs connected to multiple output ports of the receive-end electrical switching element, output the multiple data units to the all-optical switching element;
the all-optical switching element is configured to perform all-optical space division switching for the multiple data units output by the receive-end electrical switching element, and output the multiple data units to the transmit-end electrical switching element; and
the transmit-end electrical switching element is configured to perform optical/electrical conversion, by using ORs connected to multiple receive ports of the transmit-end electrical switching element, for the multiple data units output by the all-optical switching element, and then perform stage-2 electrical switching for the multiple data units after the optical/electrical conversion, and output the multiple data units through multiple output ports of the transmit-end electrical switching element.

* * * * *